United States Patent
Okamoto et al.

(10) Patent No.: US 8,346,934 B2
(45) Date of Patent: Jan. 1, 2013

(54) METHOD FOR EXECUTING MIGRATION BETWEEN VIRTUAL SERVERS AND SERVER SYSTEM USED FOR THE SAME

(75) Inventors: Takuya Okamoto, Machida (JP); Yuichi Yagawa, Yokohama (JP); Hidehisa Shitomi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 12/670,008

(22) PCT Filed: Jan. 5, 2010

(86) PCT No.: PCT/JP2010/000024
§ 371 (c)(1),
(2), (4) Date: Jan. 21, 2010

(87) PCT Pub. No.: WO2011/083505
PCT Pub. Date: Jul. 14, 2011

(65) Prior Publication Data
US 2012/0023233 A1    Jan. 26, 2012

(51) Int. Cl.
*G06F 15/173* (2006.01)
(52) U.S. Cl. .................. 709/226; 709/221; 370/221
(58) Field of Classification Search .................. 709/221, 709/226; 711/162; 370/221
See application file for complete search history.

(56) References Cited

U.S. PATENT DOCUMENTS

| | | | |
|---|---|---|---|
| 6,698,017 B1 * | 2/2004 | Adamovits et al. | 717/168 |
| 7,099,901 B2 | 8/2006 | Sutoh | |
| 7,849,168 B2 * | 12/2010 | Utsunomiya et al. | 709/221 |
| 2008/0295096 A1 | 11/2008 | Beaty et al. | |
| 2009/0138887 A1 | 5/2009 | Uehara | |
| 2009/0157926 A1 | 6/2009 | Hashimoto | |
| 2009/0259737 A1 * | 10/2009 | Aikoh et al. | 709/221 |
| 2009/0276588 A1 | 11/2009 | Murase | |
| 2009/0276771 A1 * | 11/2009 | Nickolov et al. | 717/177 |
| 2010/0085871 A1 * | 4/2010 | Barsness et al. | 370/221 |
| 2010/0125712 A1 * | 5/2010 | Murase et al. | 711/162 |
| 2010/0153082 A1 * | 6/2010 | Newman et al. | 703/11 |
| 2010/0242045 A1 * | 9/2010 | Swamy et al. | 718/104 |
| 2010/0274984 A1 * | 10/2010 | Inomata et al. | 711/162 |
| 2011/0071983 A1 * | 3/2011 | Murase | 707/649 |

FOREIGN PATENT DOCUMENTS

| | | |
|---|---|---|
| JP | 2004-54720 | 2/2004 |
| JP | 2005-222123 | 8/2005 |
| JP | 2009-151745 | 7/2009 |
| WO | 2009146001 A1 | 12/2009 |

\* cited by examiner

*Primary Examiner* — Tesfay Yohannes
(74) *Attorney, Agent, or Firm* — Brundidge & Stanger, P.C.

(57) ABSTRACT

For each of multiple migration policies, a server system 2 that accesses a storage apparatus 10 obtains a resource use amount needed to execute the migration. Each of the migration policies includes information for specifying a resource use amount of the server system 2 needed to execute the migration according to the policy. Then, the server system 2 allocates an amount of usable resources to each of the policies in accordance with the resource use amount obtained for the policy; in the migration according to each of the policies, allocates a certain amount of resources usable for executing the migration, to the virtual server which serves as either of a migration destination and a migration source, while determining the certain amount of resources within the amount of resources allocated to the policy; and executes the migration according to each of the policies in accordance with the resource use amount allocated to the policy.

14 Claims, 33 Drawing Sheets

Fig. 11A

METADATA 1100

| | | |
|---|---|---|
| inode | 10001 | 10002 |
| FILE PATH | /dir1/file1 | /dir1/file2 |
| FILE SIZE | 100kB | 23kB |
| FILE ENTITY EXISTENCE | TRUE | TRUE |
| HASH VALUE | 2222 | 3423 |
| PERMISSION | 660 | 777 |
| ACL | {root,0777},··· | {root,0777},··· |
| TIME STAMP | 20090902013045 | 20090903041243 |
| ⋮ | ⋮ | ⋮ |
| STUB EXISTENCE | TRUE | TRUE |
| STUB PATH | /dir/file1 | /dir/file2 |

Fig. 11B

METADATA 1100

| | | |
|---|---|---|
| inode | 10001 | 10002 |
| FILE PATH | /dir1/file1 | /dir1/file2 |
| FILE SIZE | 100kB | 23kB |
| FILE ENTITY EXISTENCE | TRUE | TRUE |
| HASH VALUE | 2222 | 3423 |
| PERMISSION | 660 | 777 |
| ACL | {root,0777},⋯ | {root,0777},⋯ |
| TIME STAMP | 20090902013045 | 20090903041243 |
| EXPANDED METADATA | /dir/file1.meta | /dir/file2.meta |
| ⋮ | ⋮ | ⋮ |
| STUB EXISTENCE | TRUE | TRUE |
| STUB PATH | /dir/file1 | /dir/file2 |

1111 — inode
1112 — FILE PATH
1113 — FILE SIZE
1114 — FILE ENTITY EXISTENCE
1115 — HASH VALUE
1116 — PERMISSION
1117 — ACL
1118 — TIME STAMP
1121 — EXPANDED METADATA
1119 — STUB EXISTENCE
1120 — STUB PATH

Fig. 11C

EXPANDED METADATA

```
<?XML ?>
<Metadata>
<ACL name="root"Permission="0777"/>
  :
</Metadata>
```

Fig. 16

FILE REFERENCE SCREEN 1600

| FILE REFERENCE SCREEN ||
|---|---|
| FILE SERVER: FS1 ||
| SEARCH CONDITION | DIRECTORY: /user/taro |
| FILE NAME<br><br>[         ]<br><br>UPDATE DATE<br><br>[         ]<br><br>SIZE<br><br>[         ]<br><br>[SEARCH] | SEARCH RESULT:<br>FILE NAME   SIZE       UPDATE DATE AND TIME<br>File1        100kB     2009/4/5 12:00:05<br>File2        140kB     2009/4/3 11:00:00<br>File3        200kB     2009/5/6 18:30:00 |

PROCESSING PERFORMED BY SECOND SERVER SYSTEM IN FILE REFERENCE

MIGRATION EXECUTION PROCEDURES

Fig. 21

MIGRATION POLICY DEFINITION SCREEN 2100

| MIGRATION POLICY DEFINITION SCREEN | | |
|---|---|---|
| POLICY ID | 001 | POLICY NAME |
| MIGRATION SOURCE | | MIGRATION DESTINATION |
| SERVER: - | | SERVER: - |
| VIRTUAL SERVER: - | | VIRTUAL SERVER: - |
| EXECUTION SCHEDULE ▼ EVERY DAY AT [ ] | | |
| SEARCH CONDITION:<br>LAST UPDATE DATE: MORE THAN [ ] DAYS AGO<br>SIZE: MORE THAN 100kB<br>EXTENSION ▼ ZIP | | |
| | REGISTER | CANCEL |

MIGRATION POLICY TABLE 2200

| POLICY ID | MIGRATION SOURCE | MIGRATION DESTINATION | PRIORITY LEVEL | MIGRATION CONDITION | MIGRATION SCHEDULE |
|---|---|---|---|---|---|
| 1 | 1-1 | 1-2 | 1 | atime < current - 10days | 20:00, every day |
| 2 | 1-1 | 2-1 | 2 | size > 100kB | 20:00, every day |
| 3 | 1-2 | 2-1 | 3 | atime < current - 30days | 20:00, every Sunday |

2211, 2212, 2213, 2214, 2215, 2216

EXAMPLE OF TEST DATA

| TEST DATA ID | FILE SIZE | FILE PATH |
|---|---|---|
| 1 | 1kB | /sample/1kB.dat |
| 2 | 100kB | /sample/100kB.dat |
| 3 | 1MB | /sample/1MB.dat |

STORAGE-DESTINATION DIRECTORY FOR TEST DATA:

/sample ─┬─ 1kBdat
         ├─ 100kB.dat
         └─ 1MB.dat

Fig. 28

TABLE FOR MANAGEMENT OF STANDARD
RESOURCES USE AMOUNT OF EACH POLICY

WHEN SIZE IS 1kB: (SIMILAR CALCULATION IS CARRIED OUT
FOR OTHER SIZES SUCH AS 100kB AND 1MB)

| POLICY ID | MIGRATION SOURCE | MIGRATION DESTINATION | STANDARD EXECUTION TIME | STANDARD CPU USE AMOUNT FOR VIRTUAL SERVER 1-1 | STANDARD CPU USE AMOUNT FOR VIRTUAL SERVER 1-2 | STANDARD CPU USE AMOUNT FOR VIRTUAL SERVER 2-1 |
|---|---|---|---|---|---|---|
| 1 | 1-1 | 1-2 | 10ms | 10MIPS | 10MIPS | 0MIPS |
| 2 | 1-1 | 2-1 | 20ms | 5MIPS | 0MIPS | 5MIPS |
| 3 | 1-2 | 2-1 | 20ms | 0MIPS | 5MIPS | 5MIPS |

| STANDARD CACHE USE AMOUNT FOR SERVER 1 | STANDARD LAN-ADAPTER TRANSMISSION AMOUNT FOR SERVER 1 | STANDARD FC-ADAPTER RECEPTION AMOUNT FOR SERVER 1 | STANDARD FC-ADAPTER TRANSMISSION AMOUNT FOR SERVER 1 | STANDARD CACHE USE AMOUNT FOR SERVER 2 | STANDARD LAN-ADAPTER RECEPTION AMOUNT FOR SERVER 2 | STANDARD FC-ADAPTER TRANSMISSION AMOUNT FOR SERVER 2 |
|---|---|---|---|---|---|---|
| 10MB | 0Mbps | 20Mbps | 20Mbps | 0MB | 0Mbps | 0Mbps |
| 0MB | 10Mbps | 10Mbps | 0Mbps | 0MB | 10Mbps | 10Mbps |
| 0MB | 10Mbps | 10Mbps | 0Mbps | 0MB | 10Mbps | 10Mbps |

Fig. 29

HOW TO CALCULATE STANDARD RESOURCE USE AMOUNT

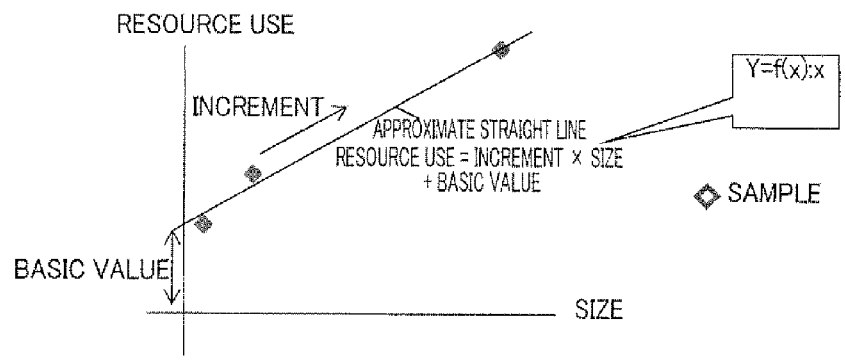

Fig. 31

MIGRATION-TARGET FILE MANAGEMENT TABLE 3100

| POLICY ID | ID OF MIGRATION-SOURCE VIRTUAL SERVER | ID OF MIGRATION-DESTINATION VIRTUAL SERVER | NUMBER OF FILES | FILE PATH | FILE SIZE |
|---|---|---|---|---|---|
| 1 | 1-1 | 1-2 | 100 | /data/aaa | 100kB |
| | | | | /file/bbb | 15kB |
| | | | | /image/ccc | 1MB |
| | | | | : | : |
| | | | | : | : |
| 2 | 1-1 | 2-1 | 20 | /text/ddd | 5kB |
| | | | | /text/eee | 5kB |
| | | | | : | : |
| | | | | : | : |
| 3 | 1-1 | 2-1 | : | : | : |

Fig. 32

AMOUNT OF RESOURCES TO BE NEEDED TO EXECUTE MIGRATION (CPU RESOURCE USE AMOUNT)

| POLICY ID | MIGRATION SOURCE | MIGRATION DESTINATION | TOTAL EXECUTION TIME | CPU RESOURCE USE AMOUNT FOR VIRTUAL SERVER 1-1 | CPU RESOURCE USE AMOUNT FOR VIRTUAL SERVER 1-2 | CPU RESOURCE USE AMOUNT FOR SERVER 1 |
|---|---|---|---|---|---|---|
| 1 | 1-1 | 1-2 | 3,000sec | 200,000MI | 200,000MI | 400,000MI |
| 2 | 1-1 | 2-1 | 1,000sec | 100,000MI | 0MI | 100,000MI |
| 3 | 1-2 | 2-1 | 2,000sec | 0MI | 200,000MI | 200,000MI |

Fig. 33

RESOURCE MANAGEMENT TABLE 3300

| SERVER ID | CPU RESOURCE AMOUNT | CACHE RESOURCE AMOUNT | LAN-ADAPTER TRANSMISSION BAND RESOURCE AMOUNT | LAN-ADAPTER RECEPTION BAND RESOURCE AMOUNT | FC-ADAPTER TRANSMISSION BAND RESOURCE AMOUNT | FC-ADAPTER RECEPTION BAND RESOURCE AMOUNT |
|---|---|---|---|---|---|---|
| 1 | 200MIPS | 10GB | 100Mbps | 100Mbps | 1Gbps | 1Gbps |
| 2 | 100MIPS | 5GB | 50Mbps | 50Mbps | 1Gbps | 1Gbps |

Fig. 34

DETERMINING RESOURCE TO BE ALLOCATED BETWEEN VIRTUAL SERVERS
(CPU RESOURCE FOR SERVER 1)

| POLICY ID | MIGRATION SOURCE | MIGRATION DESTINATION | CPU RESOURCE USE AMOUNT FOR SERVER 1 | CPU RESOURCE ALLOCATION (200MIPS) | CPU RESOURCE ALLOCATION FOR VIRTUAL SERVER 1-1 | CPU RESOURCE ALLOCATION FOR VIRTUAL SERVER 1-2 |
|---|---|---|---|---|---|---|
| 1 | 1-1 | 1-2 | 400,000MI | 114 | 57 | 57 |
| 2 | 1-1 | 2-1 | 100,000MI | 29 | 29 | 0 |
| 3 | 1-2 | 2-1 | 200,000MI | 57 | 0 | 57 |
| TOTAL | | | | 200 | 86 | 114 |

Fig. 39A

EXAMPLE OF RESOURCE ALLOCATION IN NORMAL PROCESSING

| SERVER ID | CPU RESOURCE AMOUNT | CACHE RESOURCE ALLOCATION AMOUNT | LAN-ADAPTER TRANSMISSION BAND RESOURCE AMOUNT | LAN-ADAPTER RECEPTION BAND RESOURCE AMOUNT | FC-ADAPTER TRANSMISSION BAND RESOURCE AMOUNT | FC-ADAPTER RECEPTION BAND RESOURCE AMOUNT |
|---|---|---|---|---|---|---|
| 1 | 200MIPS | 10GB | 100Mbps | 100Mbps | 1Gbps | 1Gbps |

| VIRTUAL SERVER ID | CPU RESOURCE AMOUNT | CACHE RESOURCE ALLOCATION AMOUNT | LAN-ADAPTER TRANSMISSION BAND RESOURCE AMOUNT | LAN-ADAPTER RECEPTION BAND RESOURCE AMOUNT | FC-ADAPTER TRANSMISSION BAND RESOURCE AMOUNT | FC-ADAPTER RECEPTION BAND RESOURCE AMOUNT |
|---|---|---|---|---|---|---|
| 1-1 | 180MIPS | 9GB | 90 Mbps | 90 Mbps | 900 Mbps | 900Mbps |
| 1-2 | 20MIPS | 1GB | 10Mbps | 10Mbps | 100Mbps | 100Mbps |

Fig. 39B

METHOD FOR ALLOCATING RESOURCES IN NORMAL PROCESSING

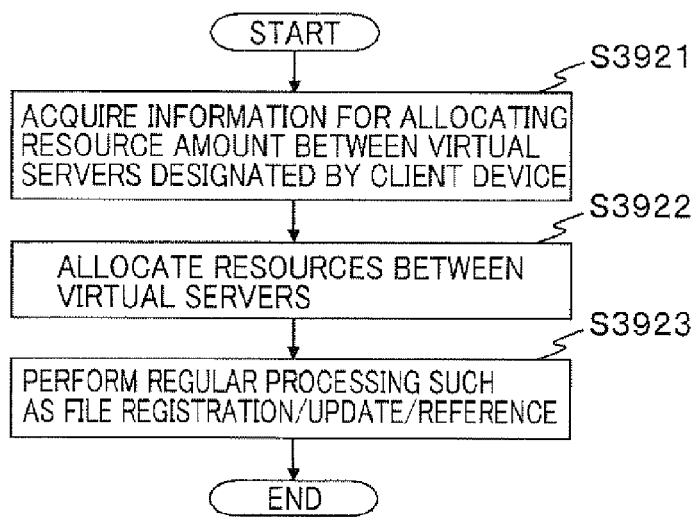

METHOD FOR EXECUTING MIGRATION BETWEEN VIRTUAL SERVERS AND SERVER SYSTEM USED FOR THE SAME

TECHNICAL FIELD

The present invention relates to a method for executing migration between virtual servers and to a server system used in this method. The present invention relates to a technique for properly allocating resources of the server system between the virtual servers implemented in the server system when migration is to be executed between the virtual servers.

BACKGROUND ART

PTL 1 describes a technique for improving the rate of utilization of a storage apparatus sharable by multiple hosts to achieve performance optimization of an overall system including the hosts and the storage. Specifically, in this technique, computational resources of a computer device serving as a host are logically divided to operate as virtual calculators, and also resources of a storage apparatus are logically divided to operate as virtual storage devices. Such logical divisions of the resources of the calculators and the resources of the storage apparatus are implemented by managing: the resources of the calculators, the resources of the storage apparatus, and a relation between each of the virtual calculators and its corresponding virtual storage apparatus.

PTL 2 describes a technique for optimizing allocation of resources between virtual servers. Specifically, for the optimization, a virtual machine monitor is provided with a function of allocating resources in accordance with a policy, and a function of converting information on a physical location of the allocated resources into information appropriate for a guest OS and notifying the guest OS of the converted information.

PTL 3 describes a technique for performing backup speedily and easily in a disk array system by using a path that data not used for the backup do not pass, without burdening the LAN. Specifically, upon receipt of a backup request for a file, a network file server module copies the file from a regular volume to a backup volume in the disk array system. Upon completion of the copy, the network file server module notifies a storage area network module of a request to make a copy to an external storage device. The storage area network module thus notified then makes a copy of the current backup volume to the external storage device.

Citation List
Patent Literature
[PTL 1] Japanese Patent Application Laid-open Publication No. 2005-222123
[PTL 2] Japanese Patent Application Laid-open Publication No. 2009-151745
[PTL 3] Japanese Patent Application Laid-open Publication No. 2004-54720

SUMMARY OF INVENTION

Technical Problems

In migration executed between virtual servers in a storage system including a server system implementing the virtual servers and a storage apparatus accessed by the server system, limited resources of the server system need to be properly allocated between the virtual servers involved with the migration so that the migration can be executed smoothly. Further, the resource allocation needs to be performed, also considering the influence of the migration load on other task services and the like.

The present invention has been made in consideration of the such circumstances, and has a main objective of providing a method for executing migration between virtual servers and providing a server system used in this method, with which, when migration is to be executed between the virtual servers, resources of the server system can be properly allocated between the virtual servers.

Solution to Problem

To achieve the above-mentioned objective, one aspect of the present invention provides a method for executing migration in an information processing system including at least one server system that accesses a storage apparatus in response to a request transmitted from a client device, and a plurality of virtual servers which are implemented in the server system. The method allowing execution of migration between the plurality of virtual servers, allows the server system to execute the steps of storing an amount of resources of the server system that are usable for executing migration, storing a plurality of policies each defining how to execute a corresponding one of a plurality of migrations, and including information for specifying a resource use amount of the server system to be used to execute the migration, for each of the policies, obtaining the resource use amount needed to execute the migration according to the policy, allocating an amount of usable resources to each of the policies in accordance with the resource use amount obtained for the policy, in the migration according to each of the policies, allocating a certain amount of resources usable for executing the migration, to the virtual server which serves as either of a migration destination and a migration source, the certain amount of resources being determined within the amount of resources allocated to the policy, and executing the migration according to each of the policies in accordance with the resource use amount allocated to the policy.

According to the present invention, for each of multiple policies each defining an execution way of migration, the server system obtains a resource use amount to be needed when the migration is executed according to that policy. Then, the server system allocates an amount of resources of the server system to each migration policy, according to the use amount obtained for that policy. Then, when migration is to be executed according to a certain policy, the server system allocates, between the virtual servers, a resource amount usable for execution of the migration, within the resource amount allocated to that certain policy. Accordingly, a usable resource amount is allocated to each policy according to a load of migration performed according to that policy, allowing resources to be allocated to the policy properly. This allows proper allocation of resources of the server system between the virtual servers, thereby making smooth execution of migration possible.

Other problems and methods for solving the problems disclosed herein will become apparent in the section, "Description of Embodiment," and the drawings.

Effects of the Invention

According to the present invention, when migration is to be executed between the virtual servers, resources of the server system can be properly allocated between the virtual servers.

BRIEF DESCRIPTION OF DRAWINGS

FIG. 11A is an example of metadata.

FIG. 11B is an example of metadata.

FIG. 11C is an example of expanded metadata 1121.

FIG. 16 is an example of a file reference screen.

FIG. 21 is an example of a migration policy definition screen 2100.

FIG. 22 is an example of a migration policy table 2200.

FIG. 28 is a diagram showing an example of a content registered in a standard resource use amount management table 2800.

FIG. 29 is a schematic diagram illustrating how to obtain a standard resource use amount through interpolation.

FIG. 31 is an example of a migration-target file management table 3100.

FIG. 32 is an example of a necessary resource amount and an execution time.

FIG. 33 is a resource management table 3300.

FIG. 34 is an example of a resource amount allocation management table 3400.

FIG. 39A is a diagram showing an example of resource allocation to each virtual server 810 in normal processing.

FIG. 39B is a flowchart illustrating processing by the server system 2 in the normal processing.

DESCRIPTION OF EMBODIMENTS

Figure 1:
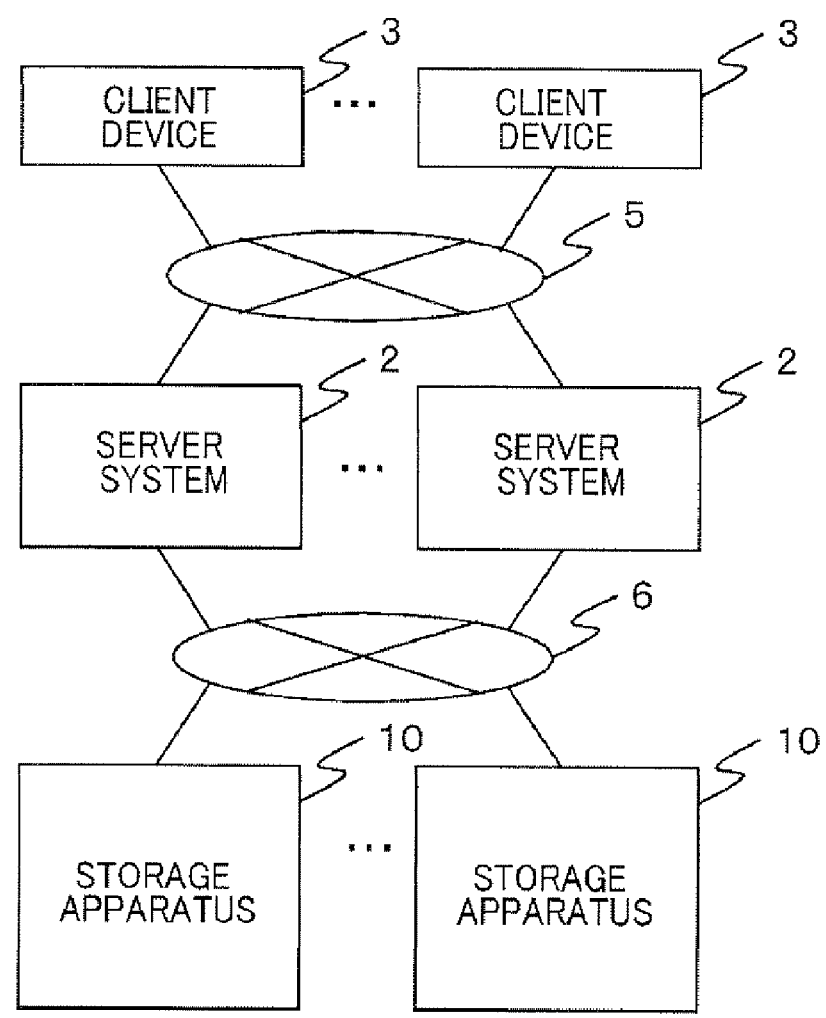
FIG. 1 is a diagram showing a schematic configuration of an information processing system 1.

An embodiment is described below referring to the drawings. FIG. 1 shows a schematic configuration of an information processing system 1 described as the embodiment. As shown in the drawing, the information processing system 1 includes one or more server systems 2, one or more storage apparatuses 10, and one or more client devices 3. The client device 3 and the server system 2 are coupled to each other communicatively through a communication network 5. The server system 2 and the storage apparatus 10 are coupled to each other communicatively through a storage network 6.

The communication network 5 is a LAN (Local Area Network), a WAN (Wide Area Network), the Internet, a public communication network, a private line, or the like. The storage network 6 is a LAN (Local Area Network), a WAN (Wide Area Network), a SAN (Storage Area Network), the Internet, a public communication network, a private line, or the like. Communication through the communication network 5 or the storage network 6 is carried out in conformity with a protocol such as TCP/IP, iSCSI (interact Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark), for example.

The client device 3 is an information apparatus that uses a storage area provided by the storage apparatus 10 via the server system 2. For example, the client device 3 is a personal computer, an office computer, or the like.

The server system 2 is an information apparatus (computer) that uses a storage area (storage area for data) provided by the storage apparatus 10. For example, the server system 2 is a personal computer, a mainframe computer, an office computer, or the like. To gain access to the storage area, the server system 2 transmits a data frame (simply called a frame below) including a data I/O request (such as a data write request and a data read request) to the storage apparatus 10.

Figure 2:
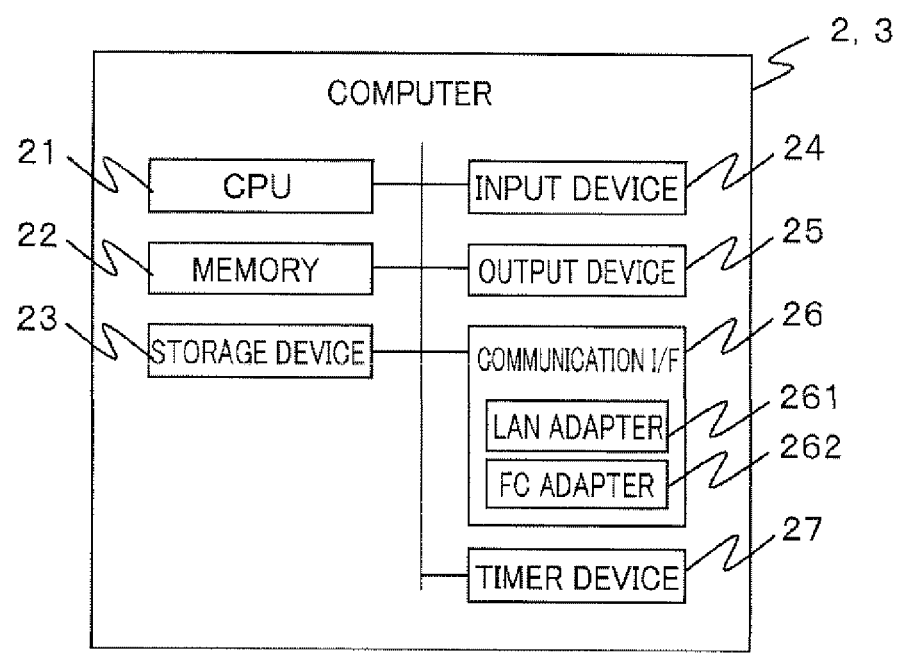
FIG. 2 is an example of hardware of an information apparatus (computer 20) usable as a server system 2 or a client device 3.

FIG. 2 shows an example of hardware of an information apparatus (computer 20) usable as the server system 2 or the client device 3. As shown in the drawing, the computer 20 includes a CPU 21, a volatile or nonvolatile memory 22 (RAM or ROM), a storage device 23 (e.g., a hard disk drive, a semiconductor storage (SSD (Solid State Drive))), an input device 24 such as a keyboard and a mouse, an output device 25 such as a liquid crystal monitor and a printer, a communication interface (called a communication I/F 26 below) such as an NIC (Network Interface Card) (first communication adapter) (called a LAN adapter 261 below) and an HBA (Host Bus Adaptor) (second communication adapter) (called a FC adapter 262 below), and a timer device 27 configured with a timer circuit, an RTC (Real Time Clock), and the like.

Figure 3:
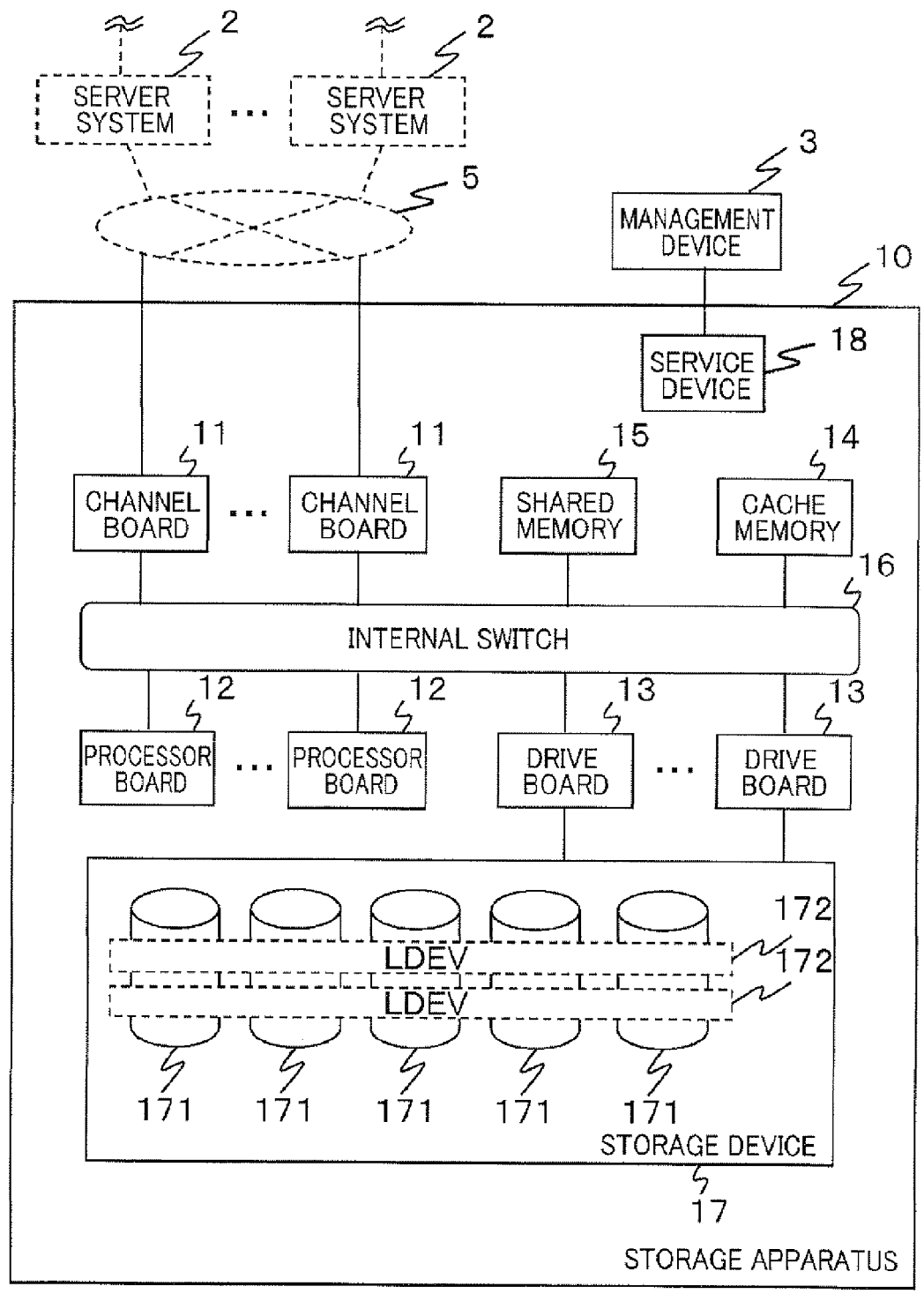
FIG. 3 is an example of a hardware configuration of a storage apparatus 10.

FIG. 3 shows an example of the storage apparatus 10 (disk array apparatus). As shown in the drawing, the storage apparatus 10 includes one or more channel boards 11, one or more processor boards 12 (Micro Processor), one or more drive boards 13, a cache memory 14, a shared memory 15, an internal switch 16, a storage device 17, and a service device 18 (SVP: SerVice Processor). The channel board 11, the processor board 12, the drive board 13, the cache memory 14, and the shared memory 15 are coupled to each other communicatively through the internal switch 16.

The channel board 11 receives a frame transmitted from the server system 2, and responds to the server system 2 with transmission of a frame including processing requested by a data I/O request included in the received frame (e.g., read data, a read completion report, or a write completion report). In the following descriptions, a frame is a Fibre Channel frame (FC frame (FC: Fibre Channel)).

In response to the data I/O request included in the frame received by the channel board 11, the processor board 12 performs processing for data transfer carried out among the channel board 11, the drive board 13, and the cache memory 14. The processor board 12 performs: passing of data (data read from the storage device 17 and data written to the storage device 17) between the channel board 11 and the drive board 13 via the cache memory 14; staging (reading data from the storage device 17) and destaging (writing data to the storage device 17) of data stored in the cache memory 14; and the like.

The cache memory 14 is configured with a RAM (Random Access Memory) capable of high-speed access. The cache memory 14 stores data to be written to the storage device 17 (called write data below), data read from the storage device 17 (called read data below), and the like. The shared memory 15 stores various kinds of information used to control the storage apparatus 10.

The drive board 13 communicates with the storage device 17 when reading data from the storage device 17 and writing data to the storage device 17. For example, the internal switch 16 is configured with a high-speed cross-bar switch. Communication through the internal switch 16 is performed in conformity with a protocol such as Fibre Channel, iSCSI, or TCP/IP.

The storage device 17 includes multiple storage drives 171. For example, the storage drive 171 is a hard disk drive of a type such as SAS (Serial Attached SCSI), SATA (Serial ATA), FC (Fibre Channel), PATA (Parallel ATA), or SCSI, or a semiconductor storage device (SSD).

The storage device 17 controls the storage drives 171 by a control method such as RAID (Redundant Arrays of Inexpensive (or Independent) Disks) to provide logical storage areas, and provides a storage area with each of the logical storage areas as a unit. These logical storage areas are logical devices (LDEV 172 (LDEV: Logical Device)) each configured using a RAID group (Parity Group). Further, the storage apparatus 10 provides the server system 2 with a logical storage area (called a LU (logical unit, logical volume) below) configured using the LDEVs 172. The storage apparatus 10 manages a correspondence between the LU and the LDEV 172. Based on the correspondence, the storage apparatus 10 identifies the LDEV 172 that corresponds to the LU or identifies the LU that corresponds to LDEV 172.

Figure 4A:
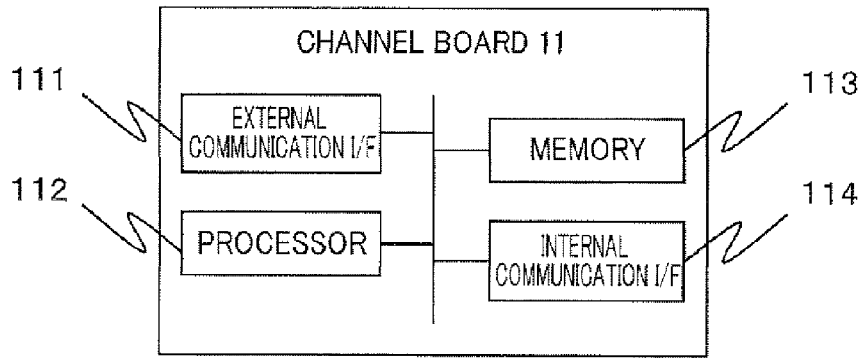
FIG. 4A is an example of a hardware configuration of a channel board 11.

FIG. 4A shows a hardware configuration of the channel board 11. The channel board 11 includes: an external communication interface (called an external communication I/F 111 below) having a port for communication with the server system 2 (communication port), a processor 112 (including a frame processing chip and a frame transfer chip to be described later), a memory 113, and an internal communication interface (called an internal communication I/F 114 below) having a port for communication with the processor board 12 (communication port).

The external communication I/F 111 is configured with an NIC (Network Interface Card), an HBA (Host Bus Adaptor), and the like. The processor 112 is configured with a CPU (Central Processing Unit), an MPU (Micro Processing Unit), or the like. The memory 113 is a RAM (Random Access Memory) or a ROM (Read Only Memory). The internal communication I/F 114 communicates with the processor board 12, the drive board 13, the cache memory 14, and the shared memory 15, via the internal switch 16.

Figure 4B:
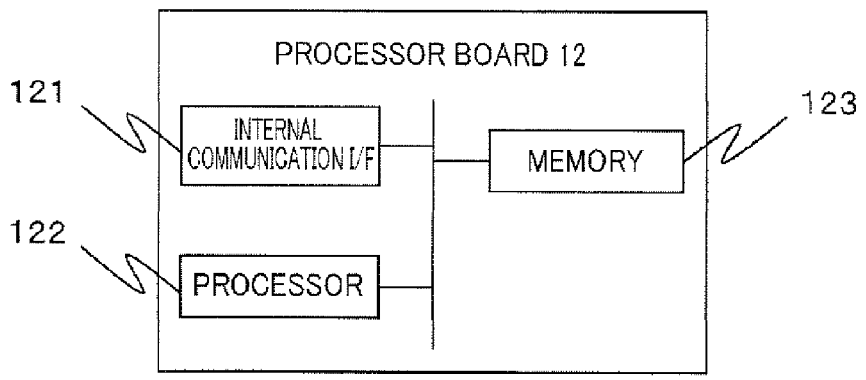
FIG. 4B is an example of a hardware configuration of a processor board 12.

FIG. 4B shows a hardware configuration of the processor board 12. The processor board 12 includes an internal communication interface (called an internal communication I/F 121 below), a processor 122, and a memory 123 (local memory). The processor 122 can access the memory 123 with a higher performance (at a higher speed) than accessing the shared memory 15.

The internal communication I/F 121 communicates with the channel board 11, the drive board 13, the cache memory 14, and the shared memory 15, via the internal switch 16. The processor 122 is configured with a CPU, an MPU, or using DMA (Direct Memory Access). The memory 123 is a RAM or a ROM. The processor 122 can access both of the memory 123 and the shared memory 15.

Figure 4C:
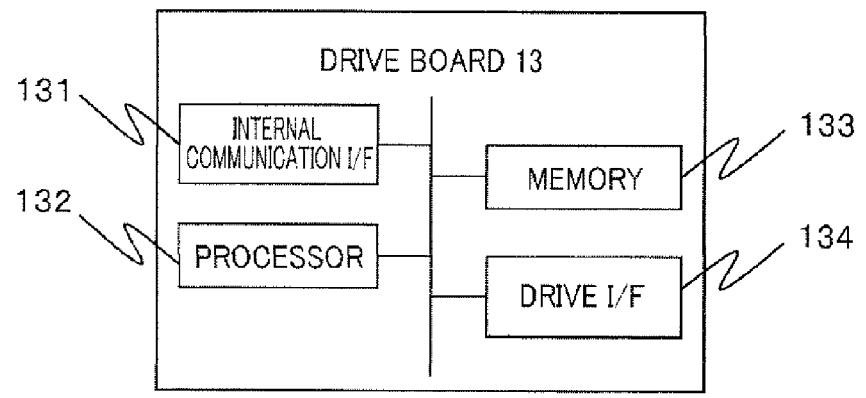
FIG. 4C is an example of a hardware configuration of a drive board 13.

FIG. 4C shows a hardware configuration of the drive board 13. The drive board 13 includes an internal communication interface (called an internal communication I/F 131 below), a processor 132, a memory 133, and a drive interface (called a drive I/F 134 below). The internal communication I/F 131 communicates with the channel board 11, the processor board 12, the cache memory 14, and the shared memory 15, via the internal switch 16. The processor 132 is configured with a CPU or a MPU. For example, the memory 133 is a RAM or a ROM. The drive I/F 134 communicates with the storage device 17.

The service device 18 shown in FIG. 3 performs control and status monitoring of the components of the storage apparatus 10, and is a computer having a CPU and a memory. The service device 18 communicates with the components of the storage apparatus 10, such as the channel board 11, the processor board 12, the drive board 13, the cache memory 14, the shared memory 15, and the internal switch 16, via the internal switch 16 or communication means such as a LAN. The service device 18 acquires operation information and the like from the components of the storage apparatus 10 as appropriate, and provides the information to a management device 4. Further, in accordance with control information transmitted from the management device 4, the service device 18 performs various settings, control, maintenance (software installation and update), and the like for the components.

The management device 4 is a computer coupled communicatively to the service device 18 via a LAN or the like. For the control and monitoring of the storage apparatus 10, the management device 4 includes a user interface such as GUI (Graphical User Interface) or CLI (Command Line Interface).

Figure 5:
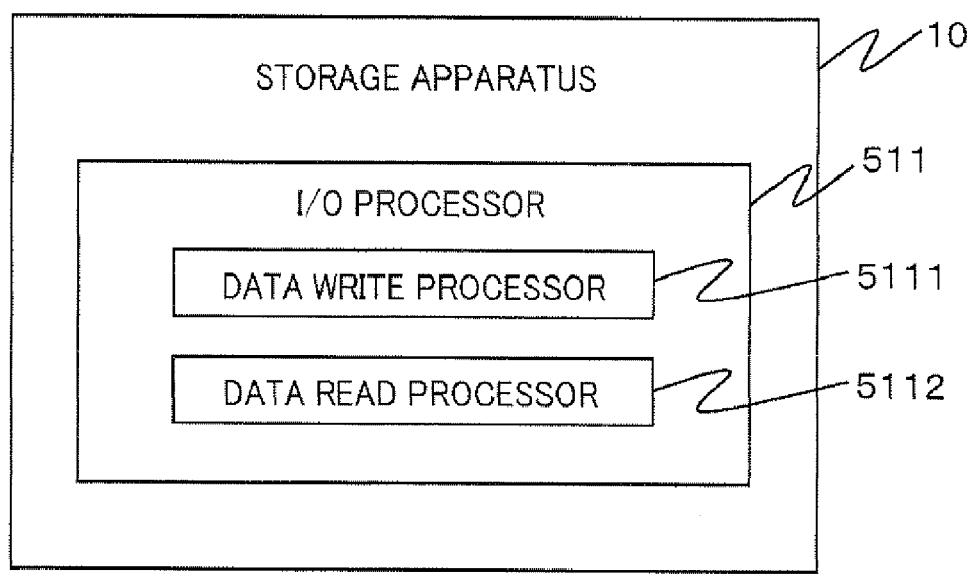
FIG. 5 is a diagram showing main functions of the storage apparatus 10 that are used for service provided to the server system 2.

FIG. 5 shows main functions of the storage apparatus 10 that are used for service provided to the server system 2. As shown in the drawing, the storage apparatus 10 includes an I/O processor 511. The I/O processor 511 includes a data write processor 5111 that performs processing for a write to the storage device 17 and a data read processor 5112 that performs processing for a read from the storage device 17.

Note that the I/O processor 511 is implemented by the hardware of the channel board 11, processor board 12, or drive board 13 of the storage apparatus 10, or implemented when the processor 112, 122, or 132 reads a program stored in the corresponding memory 113, 123 or 133 and executes it.

Figure 6:
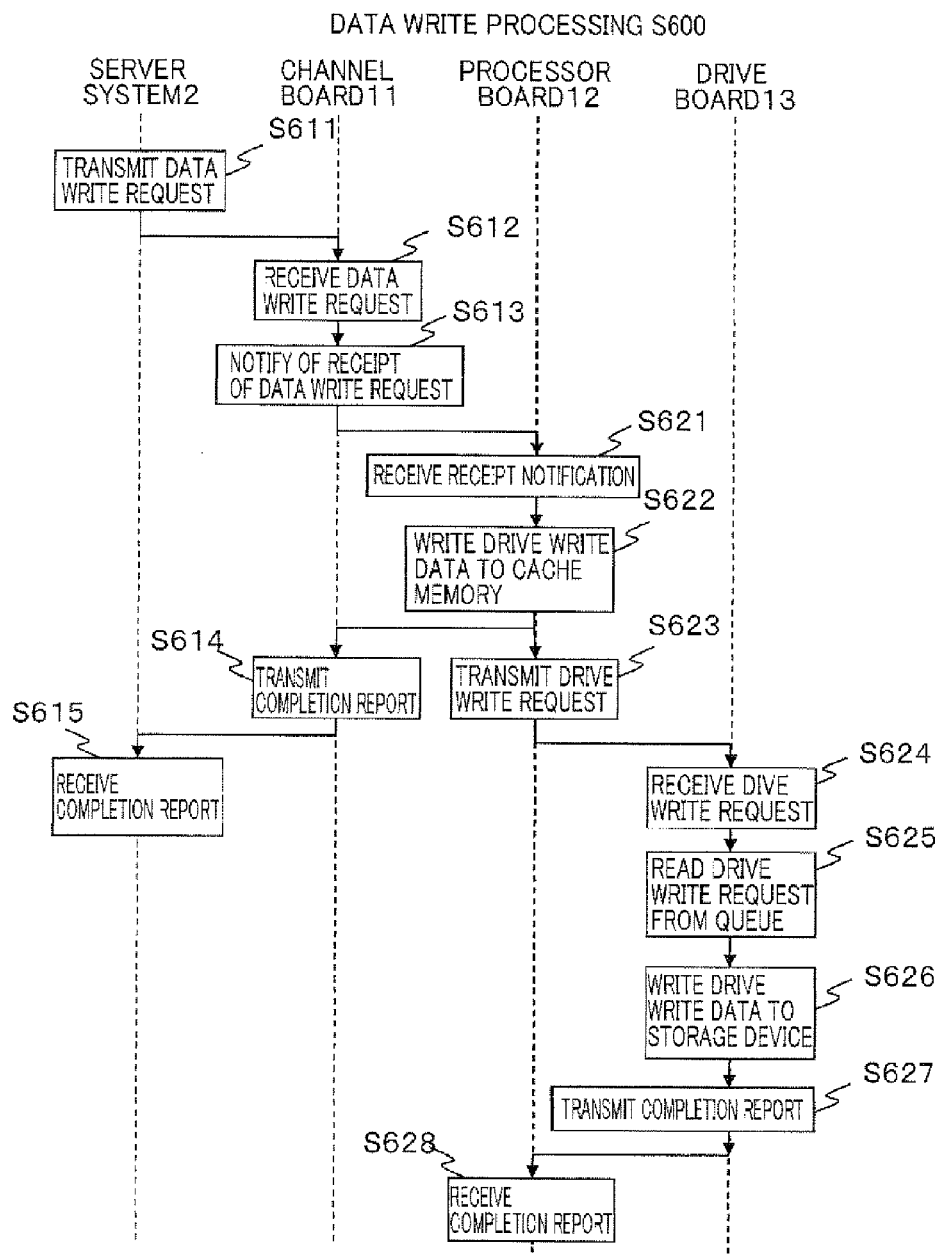
FIG. 6 is a flowchart illustrating data write processing S600.

FIG. 6 is a flowchart illustrating processing performed by the data write processor 5111 of the I/O processor 511 when the storage apparatus 10 receives a frame including a data write request from the server system 2 (called data write processing S600 below). The data write processing S600 is described below with the drawing. Note that, in the following descriptions, an "S" before each reference numeral is short for "step".

The server system 2 transmits a frame, and the channel board 11 of the storage apparatus 10 receives the frame (S611, S612). Upon receipt of the frame, the channel board 11 notifies the processor board 12 and the drive board 13 of the frame receipt (S613).

Upon receipt of the notification from the channel board 11 (S621), the processor board 12 generates a drive write request based on a data write request in the frame, and stores drive write data corresponding to the generated drive write request in the cache memory 14. Then, the processor board 12 transmits the generated drive write request to the drive board 13 (S622, S623). The channel board 11 transmits a completion report to the server system 2 (S614), and the server system 2 receives the completion report (S615).

Upon receipt of the drive write request, the drive board 13 registers the drive write request in a write processing queue (S624). The drive board 13 reads the drive write request from the write processing queue as appropriate (S625). From the cache memory 14, the drive board 13 reads the drive write data designated by the drive write request thus read out, and writes the drive write data thus read, to the storage drive 171 (S626).

Next, the drive board 13 notifies the processor board 12 of a report indicating that a write of the drive write data requested by the drive write request has been completed (completion report) (S627), and the processor board 12 receives the completion report thus transmitted (S628).

Figure 7:
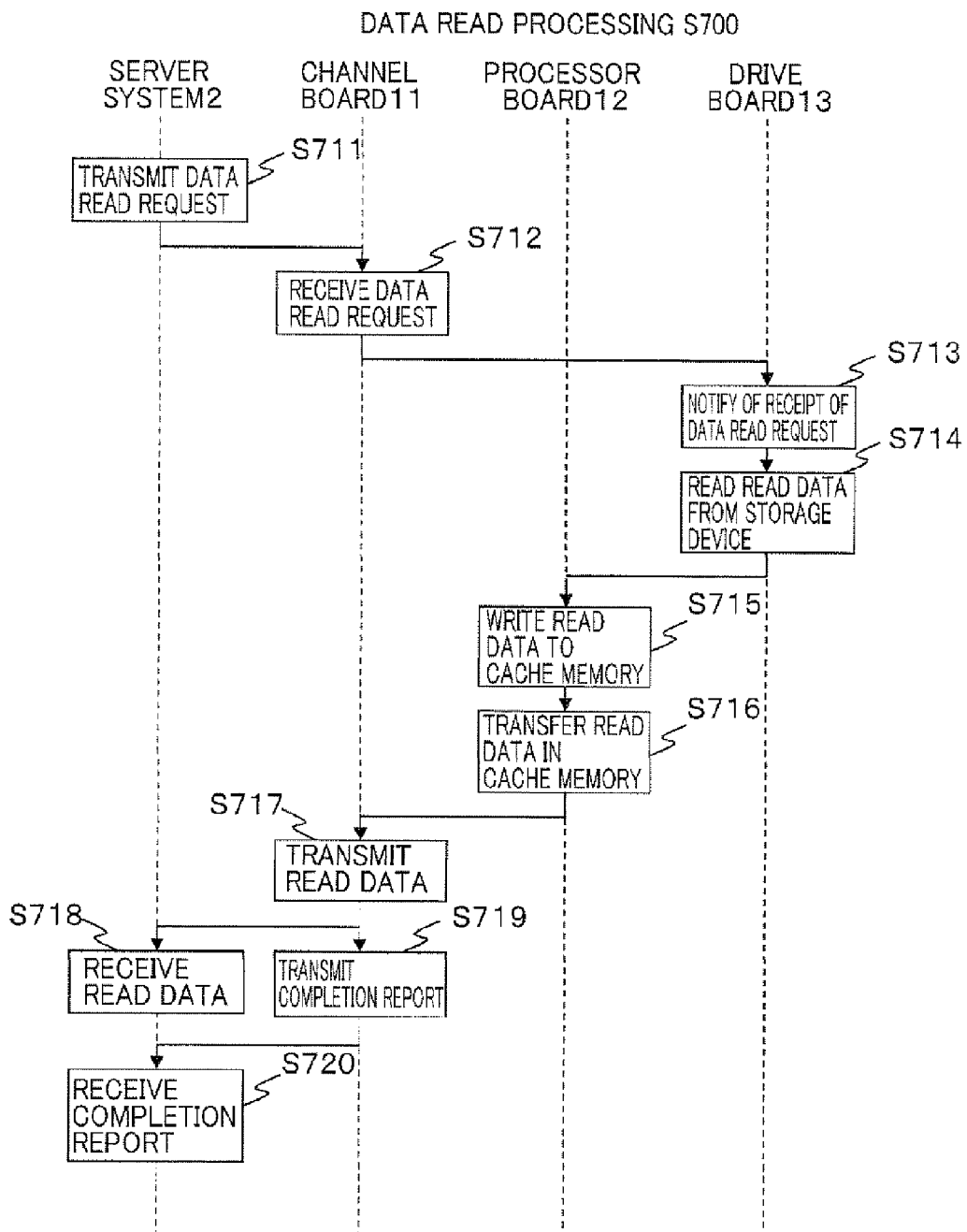
FIG. 7 is a flowchart illustrating data read processing S700.

FIG. 7 is a flowchart illustrating I/0 processing performed by the data read processor 4512 of the I/O processor 511 of the storage apparatus 10 when the storage apparatus 10 receives a frame including a data read request from the server system 2 (called data read processing S700 below). The data read processing S700 is described below with the drawing.

The server system 2 transmits a frame, and the channel board 11 of the storage apparatus 10 receives the frame (S711, S712). Upon receipt of the frame from the server system 2, the channel board 11 notifies the processor board 12 and the drive board 13 of the frame receipt (S713).

Upon receipt of the notification from the channel board 11, the drive board 13 reads, from the storage device 17 (the storage drive 171), data designated by a data read request included in the frame (designated for example with an LBA (Logical Block Address)) (S714). Note that the processing of a read from the storage device 17 (S714) is omitted if the read data is in the cache memory 14 (cache hit). The processor board 12 writes the data read by the drive board 13 to the cache memory 14 (S715). The processor board 12 transfers the data written in the cache memory 14 to the communication I/F as appropriate (S716).

To the server system 2, the channel board 11 sequentially transmits the read data sent from the processor board 12 (S717, S718). Upon completion of the read data transmission, the channel board 11 transmits a completion report to the server system 2 (S719), and the server system 2 receives the completion report thus transmitted (S720).

<Description of Functions>

Next, a description is given of functions of each of the server system 2, the client device 3, and the storage apparatus 10.

Figure 8:
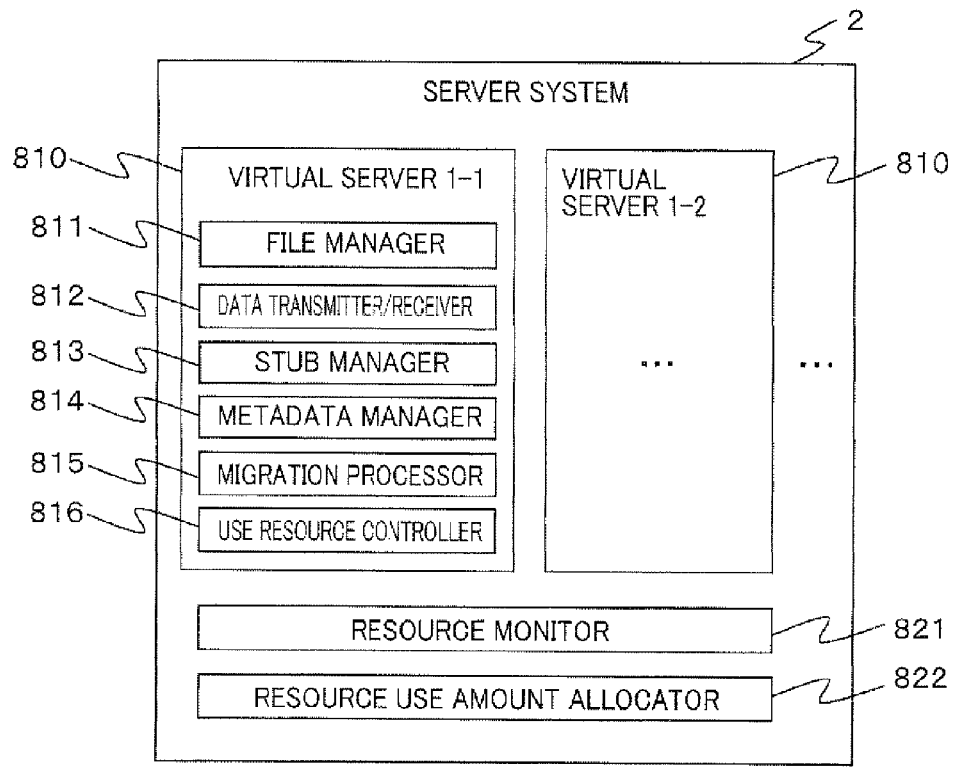
FIG. 8 is a diagram showing functions of the server system 2.

FIG. 8 shows main functions of the server system 2. As shown in the drawing, the server system 2 includes multiple virtual servers 810, and functions implemented by each of the virtual servers 810, specifically, a file manager 811, a data transmitter/receiver 812, a stub manager 813, a metadata manager 814, a migration processor 815, a resource use controller 816, a resource monitor 821, and a resource use amount allocator 822. Among these, file-related functions, such as the file manager 811, the stub manager 813, and the metadata manager 814, are built based, for example, on a network file system (distributed file system) such as NFS (Network File System), CIFS (Common Internet File System), or AFS (Andrew File System). Note that these functions are performed when the CPU 21 of the server system 2 reads a program stored in the memory 22 or in the storage device 23 and executes it.

The virtual server 810 is a virtual device implemented by a virtualization board (Virtualization Layer) (not shown) that operates in the server system 2. The virtual server 810 is implemented by a scheme (hypervisor scheme) in which a virtualization board is directly implemented on the hardware of the server system 2 without involvement of a host OS (Host Operating System), or by a scheme (host OS scheme) in which a host OS involves between hardware and a virtualization board.

Figure 9:
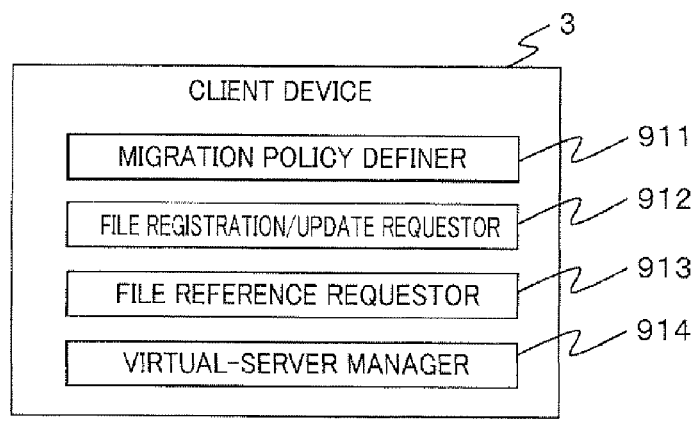
FIG. 9 is a diagram showing main functions of the client device 3.

FIG. 9 shows main functions of the client device 3. As shown in the drawing, the client device 3 includes a migration policy definer 911, a file registration/update requestor 912, a file reference requestor 913, and a virtual-server manager 914. Note that these functions are performed when the CPU 21 of the client device 3 reads a program stored in the memory 22 or in the storage device 23 and executes it.

Figure 10:
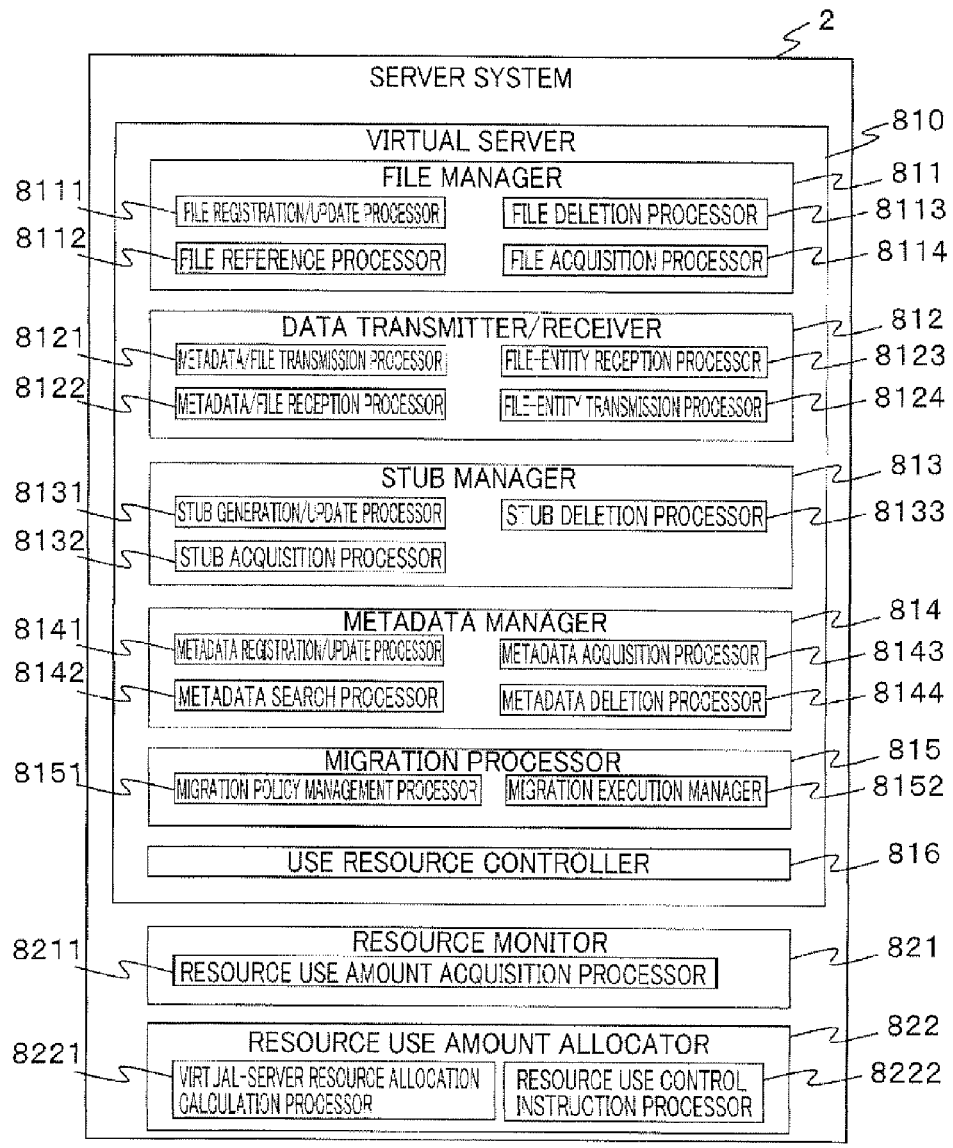
FIG. 10 is a diagram showing details of functions of the server system 2.

FIG. 10 is a diagram showing the functions of the server system 2 shown in FIG. 8 in more detail. As shown in the drawing, the file manager 811 shown in FIG. 8 includes a file registration/update processor 8111, a file reference processor 8112, a file deletion processor 8113, and a file acquisition processor 8114.

Upon receipt of a file registration request from the file registration/update requestor 912 of the client device 3, the file registration/update processor 8111 registers (stores) a registration-target file in the storage apparatus 10. Moreover, upon receipt of a file update request from the file registration/update requestor 912 of the client device 3, the file registration/update processor 8111 refers to metadata sets stored in the storage apparatus 10 to search for a file targeted by the update request, reads the update-target file, updates its contents, and stores the updated file in the storage apparatus 10.

Upon receipt of a file reference request from the file reference requestor 913 of the client device 3, the file reference processor 8112 refers to metadata sets stored in the storage apparatus 10 to search for a file targeted by the reference request, reads the searched-out file from the storage apparatus 10, and transmits it to the client device 3.

Upon receipt of a file deletion request from, for example, the file registration/update requestor 912, the file deletion processor 8113 refers to metadata sets stored in the storage apparatus 10 to search for a file targeted by the deletion request, and deletes the searched-out file from the storage apparatus 10. In addition, in response to a file deletion request issued at the time of migration to be described later, the file deletion processor 8113 deletes a deletion-target file from the storage apparatus 10.

From the storage apparatus 10, the file acquisition processor 8114 acquires a file requested by the file reference processor 8112 or the like.

As shown in FIG. 10, the data transmitter/receiver 812 includes a metadata/file transmission processor 8121, a metadata/file reception processor 8122, a file-entity reception processor 8123, and a file-entity transmission processor 8124.

In execution of migration, the metadata/file transmission processor 8121 transmits a migration-target file and its metadata to a migration-destination storage apparatus 10.

In execution of migration, the metadata/file reception processor 8122 receives a file and its metadata transmitted from the migration-destination storage apparatus 10 in response to the metadata/file transmission processor 8121 transmitting the migration-target file and its metadata to the migration-destination storage apparatus 10, and checks the received file and metadata with the transmitted file and metadata. The transmitted file and the received file are checked with each other based, for example, on a hash value (a hash value generated for the file) included in the metadata.

The file-entity reception processor 8123 transmits, to a different virtual server 810, a file (file entity) transmission request attached with (using as an argument) information indicating a migration destination of a migrated file (the information is a file or data storing a storage destination of the file, and is called a stub below).

Upon receipt of the file (file entity) transmission request sent from the file-entity reception processor 8123 of a different virtual server 810, the file entity transmission processor 8124 acquires a file (file entity) that corresponds to the stub from the storage apparatus 10, and transmits the acquired file (file entity) to the different virtual server 810 that has transmitted the transmission request.

The stub manager 813 shown in FIG. 8 includes a stub generation/update processor 8131, a stub acquisition processor 8132, and a stub deletion processor 8133.

The stub generation/update processor 8131 generates and updates a stub. For example, the stub generation/update processor 8131 generates a stub for a file targeted for migration in execution of migration. Further, if the content of a stub is changed as a result of a change in, for example, a storage location of a file stored in the migration-destination storage apparatus 10, the content of a stub stored in the migration-source storage apparatus 10 is updated.

The stub acquisition processor 8132 acquires the content of a stub from a different virtual server 810 or the like. The stub deletion processor 8133 deletes an unneeded stub from the storage apparatus 10. For example, when a migration-target file stored in a migration-destination storage apparatus 10 has been deleted, the stub deletion processor 8133 deletes a stub for that file.

The metadata manager 814 shown in FIG. 8 includes a metadata registration/update processor 8141, a metadata search processor 8142, a metadata acquisition processor 8143, and a metadata deletion processor 8144.

The metadata registration/update processor 8141 registers, in the storage apparatus 10, metadata generated for a file when the file is registered by the file manager 811. Further, in response to file update by the file manager 811, the metadata registration/update processor 8141 updates metadata for the updated file (file stored in the storage apparatus 10).

At the time of file reference by the file manager 811 or at the timing when migration is executed, the metadata search processor 8142 searches for metadata by using an update time or size as a search key, and extracts a file that matches a condition. The metadata acquisition processor 8143 acquires metadata from the storage apparatus 10 in response to a request from the file manager 811 or the like.

In response to deletion of a file stored in the storage apparatus 10 or in response to a request from the file manager 811 or the like, the metadata deletion processor 8144 deletes metadata from the storage apparatus 10. Note that, when a file is deleted from a migration-source storage apparatus 10 due to migration, metadata for the deleted file is not deleted in principle.

The migration processor 815 shown in FIG. 8 includes a migration-policy management processor 8151 and a migration execution manager 8152.

The migration-policy management processor 8151 performs management (registration/change/deletion) of a policy defining an execution way of migration (data migration) (called a migration policy below). The policy is set by the function of the migration policy definer 911 of the client device 3.

The migration execution manager 8152 manages execution of migration-related processing. When a migration execution timing based on a registered migration policy comes, the migration execution manager 8152 executes migration for which the execution timing has come.

The resource use amount controller 816 shown in FIG. 8 performs control so that an amount of resources used by the virtual server 810 will not exceed a pre-set allocation amount during migration execution. The specifics of the processing performed by the resource use amount controller 816 will be described later.

The resource monitor 821 shown in FIG. 8 includes a resource use amount acquisition processor 8211. The resource use amount acquisition processor 8211 measures a use amount of resources of the server system 2 per unit of time and stores the measured amount. The use amount measured by the resource monitor 821 is referred to by the resource use amount controller 816.

The resource use amount allocator 822 shown in FIG. 8 includes a virtual-server resource allocation calculation processor 8221 and a resource use control instruction processor 8222.

In execution of migration, the virtual-server resource allocation calculation processor 8221 determines an amount of resources to be allocated between the virtual servers 810. As will be described later, the virtual-server resource allocation calculation processor 8221 determines the amount of resources to be allocated between the virtual servers 810, based on information such as the number and the size of migration-target files.

To control the resource use of each of the virtual servers 810, the resource use control instruction processor 8222 instructs (notifies) the resource use amount controller 816 of the amount of resources usable by each of the virtual servers 810.

FIG. 11A shows an example of metadata. As shown in the drawing, metadata 1100 includes information pieces such as an mode 1111, a file path 1112, a file size 1113, a file entity existence 1114, a hash value 1115, a permission 1116, an ACL 1117 (ACL: Access Control List), a time stamp 1118, a stub existence 1119, and a stub path 1120.

Among these, in the inode 1111, a file identifier, such as a file name, is set. In the file path 1112, a path name of file storage destination (directory name and a file name) is set. In the file size 1113, the data size of a file is set. In the file entity existence 1114, "False" is set when a file entity does not exist because the file corresponding to the metadata has been migrated, and "True" is set when the file entity exists.

In the hash value 1115, a hash value generated based on the file is set. In the permission 1116, a file permission based on an access right (e.g., a file permission based on POSIX (Portable Operating System Interface)) is set. In the ACL 1117, an access authority for each user is set. In the time stamp 1118, the time of last access to the file (atime), the time of last modification to the file (mtime), and the time of last status change to the file (ctime) are set. In the stub existence 1119, "True" is set when a stub is generated by migration execution. In the stub path 1120, information indicating a storage location of a stub (e.g., a path of the storage destination) is set.

If the storage apparatus 10 is designed to store files in archive format, the format of metadata is as shown in FIG. 11B for example. As shown in the drawing, in addition to the information pieces shown in FIG. 11A, the metadata in this case further has an expanded metadata 1121 being information indicating a storage location of expanded metadata. FIG. 11C shows an example of the expanded metadata 1121.

Figure 12:
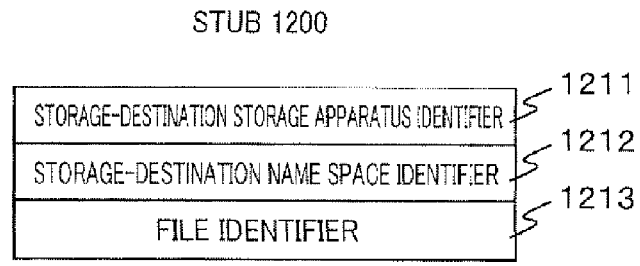
FIG. 12 is an example of a stub.

FIG. 12 shows an example of a stub. As shown in the drawing, a stub 1200 includes information pieces such as: a storage-destination storage apparatus identifier 1211 in which an identifier of a storage apparatus 10 storing a file is set; an identifier 1212 in which a name space of a storage location of a file is set; and a file identifier 1213 in which a file identifier in a name space is set.

<File Registration/Update Processing>

Figure 13:
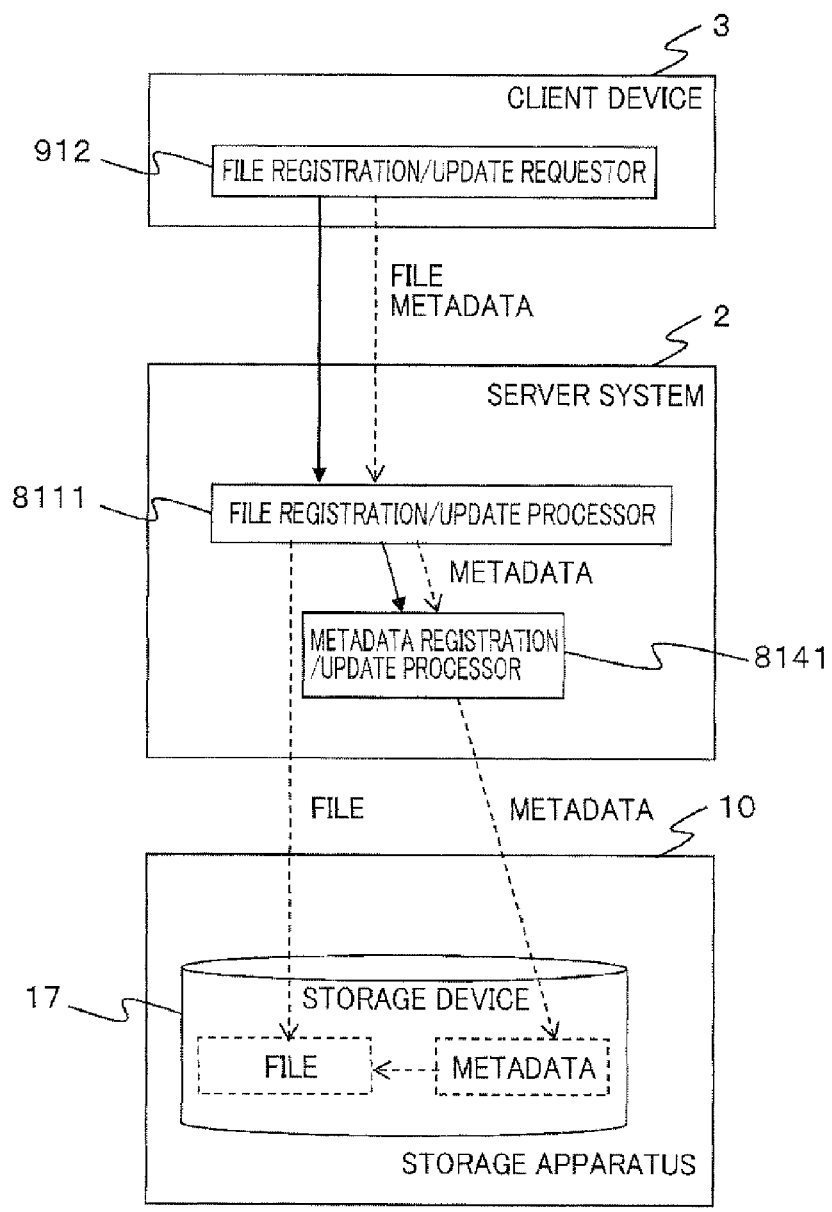
FIG. 13 is a diagram illustrating file registration/update processing.

FIG. 13 shows an overview of processing for registration/update of a file stored in the storage apparatus 10, which is performed by the file manager 811 of the virtual server 810 of the server system 2. Note that, in FIG. 13, solid lines indicate processing flows, whereas dotted lines indicate data flows. This expression also applies to FIGS. 15, 17, and 36.

Figure 14:
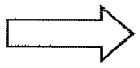
FIG. 14 is an example of a file registration/update instruction screen 1400.

In the file registration/update processing, first, the file registration/update requestor 912 displays such a screen as shown in FIG. 14 for example (called a file registration/update instruction screen 1400 below), receives a file registration/update request from a user, and transmits the received registration/update request to the server system 2. A file targeted for registration or update and its metadata are attached to this request.

Upon receipt of the registration/update request, the file registration/update processor 8111 of the server system 2 transmits the file received along with the request, to the storage apparatus 10. Further, the metadata registration/update processor 8141 updates the received metadata, and transmits the updated metadata to the storage apparatus 10. The storage apparatus 10 stores the file and the metadata transmitted from the server system 2 in the storage device 17.

<File Reference Processing>

Figure 15:
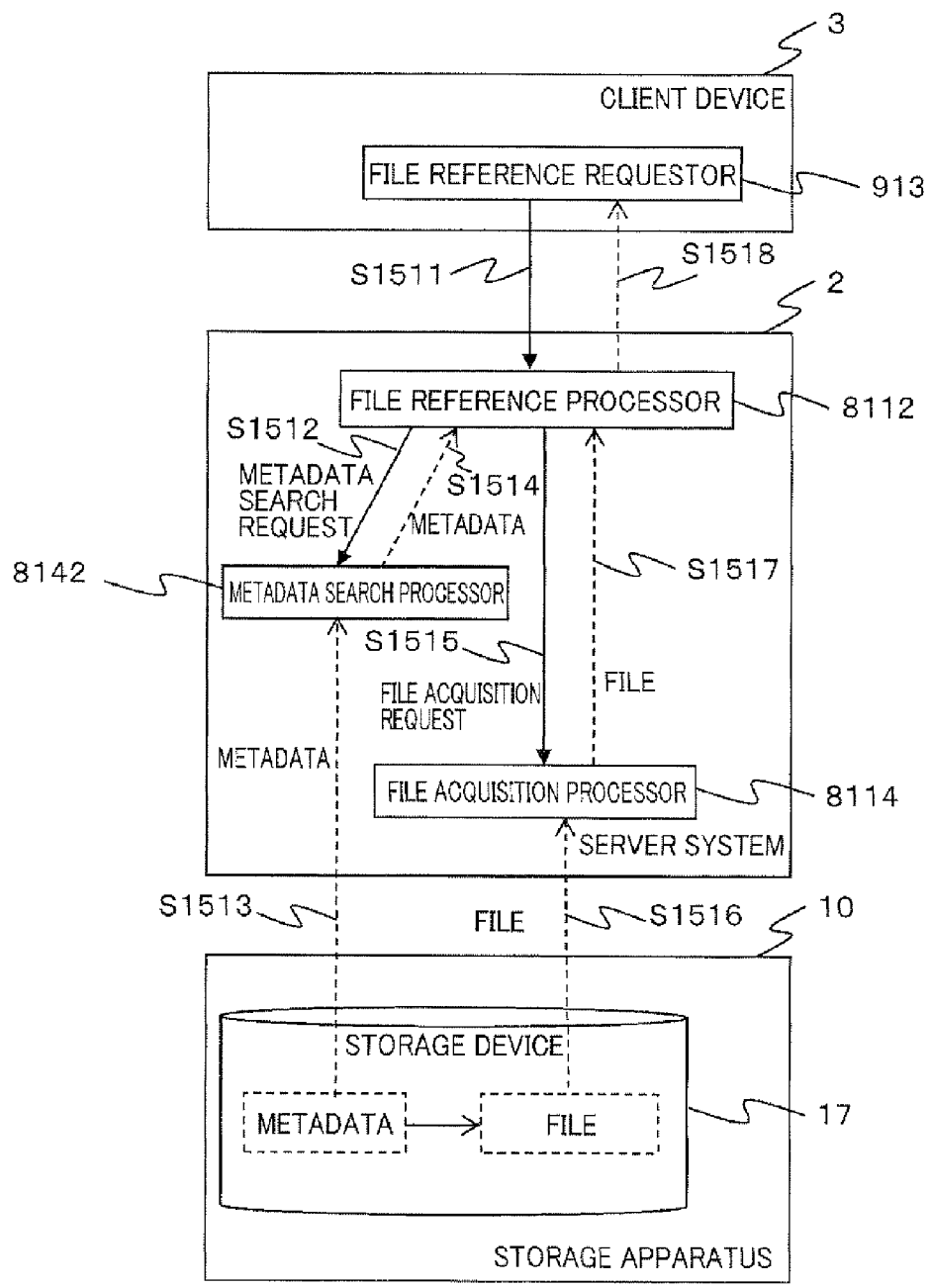
FIG. 15 is a diagram illustrating file reference processing.

FIG. 15 shows an overview of processing for referring to a file stored in the storage apparatus 10. The file reference processing shown in the drawing is performed by the file manager 811 of the virtual server 810 of the server system 2.

In the file reference processing, first, the file reference requestor 913 of the client device 3 displays such a screen as shown in FIG. 16 for example (called a file reference screen 1600 below), receives a file reference request from a user, and transmits the received reference request to the server system 2 (S1511). Note that information for designating a reference-target file is attached to this request.

Upon receipt of the reference request, the file reference processor 8112 of the server system 2 transmits a metadata search request to the metadata search processor 8142 of the metadata manager 814 (S1512). In response to the search request, the metadata search processor 8142 searches for metadata stored in the storage apparatus 10 (S1513), and transmits the metadata thus searched out, to the file reference processor 8112 (S1514).

Next, to the file acquisition processor 8114, the file reference processor 8112 transmits a request to acquire a file corresponding to the searched-out metadata (S1515). In response to the acquisition request, the file acquisition processor 8114 acquires a file stored in the storage apparatus 10 (S1516), and passes the acquired file to the file reference processor 8112 (S1517). The file reference processor 8112 transmits the acquired file to the client device 3 that has transmitted the reference request (S1518).

Figure 17:
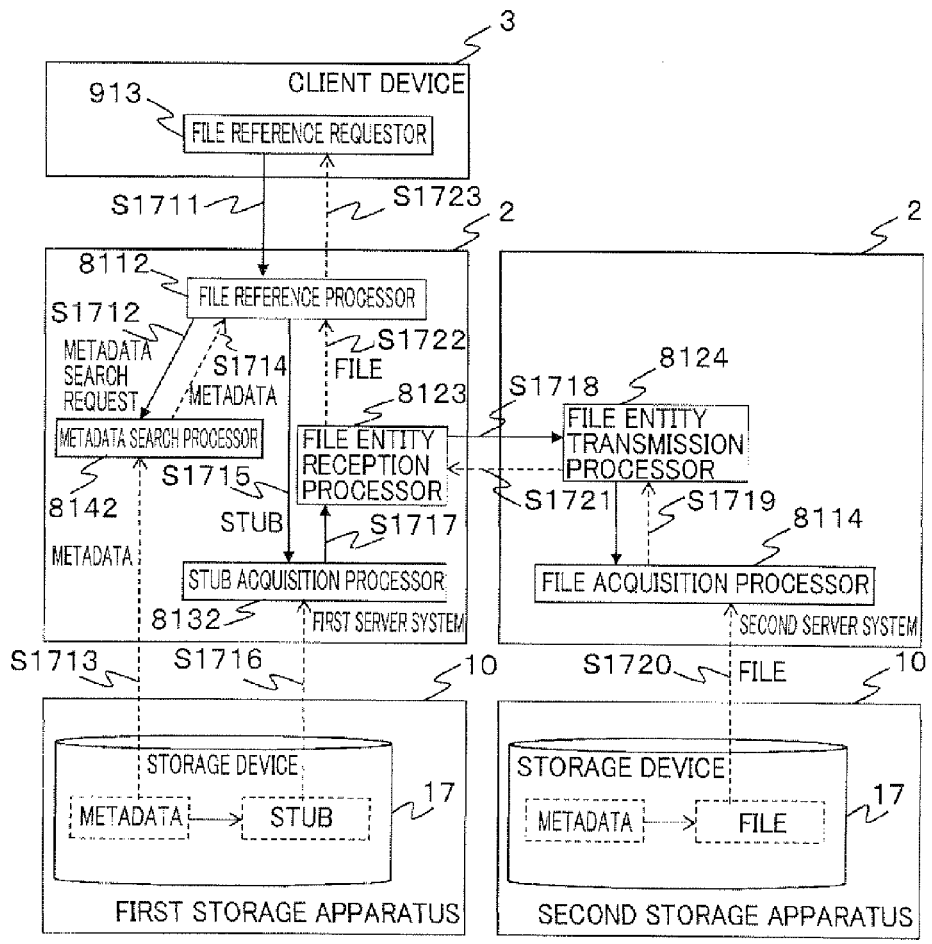
FIG. 17 is a diagram illustrating file reference processing.

FIG. 17 is a diagram illustrating file reference processing performed when a file targeted by a reference request does not exist in the storage apparatus 10 (a first storage apparatus 10) (when the file has been migrated to a different storage apparatus 10 as a result of migration).

Processing steps of S1711 to S1714 in the drawing are the same as those of S1511 to S1514 in FIG. 15.

After S1714, to the stub acquisition processor 8132, the file reference processor 8112 transmits a request to acquire a stub corresponding to the metadata that has been searched out (S1715). In response to the acquisition request, the stub acquisition processor 8132 acquires a stub stored in the storage apparatus 10 (S1716), and passes the acquired stub to the file-entity reception processor 8123 (S1717).

The file-entity reception processor 8123 refers to the passed stub, and transmits a file acquisition request to the file-entity transmission processor 8124 of a server system 2 (second server system 2) coupled with a storage apparatus 10 (second storage apparatus 10) storing a file targeted by the reference request (S1718). In response to the acquisition request, the file-entity transmission processor 8124 of the second server system 2 transmits the acquisition request to the file acquisition processor 8114 of the second server system 2. Then, the file acquisition processor 8114 acquires a file stored in the second storage apparatus 10, and passes the acquired file to the file-entity transmission processor 8124 (S1719, S1720).

The file-entity transmission processor 8124 transmits the passed file to the file-entity reception processor 8123 of the first server system 2 (S1721). Upon receipt of the file, the file-entity reception processor 8123 passes the received file to the file reference processor 8112 (S1722). The file reference processor 8112 transmits the acquired file to the client device 3 that has transmitted the reference request (S1723).

Figure 18:
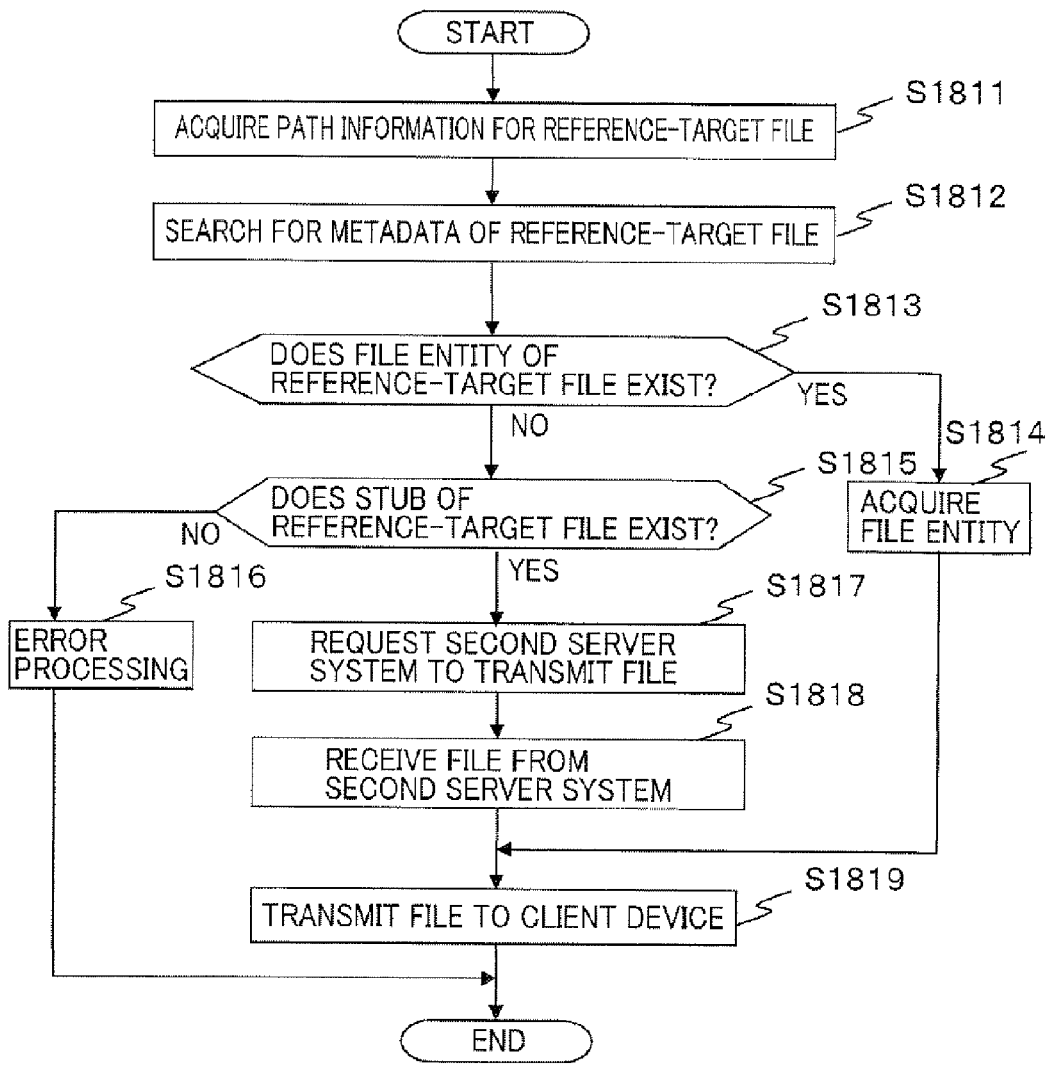
FIG. 18 is a flowchart illustrating processing performed by a first server system 2 in the file reference processing.

FIG. 18 is a flowchart illustrating processing performed by the server system 2 (first server system 2) in the file reference processing shown in FIGS. 15 and 17.

Upon receipt of a reference request from the client device (S1811), the file reference processor 8112 of the server system 2 transmits a metadata search request to the metadata search processor 8142 of the metadata manager 814 (S1812). Here, the search key is file designation information (e.g., path information designating a file) attached to the reference request. In response to the search request, the metadata search processor 8142 searches for metadata stored in the storage apparatus 10, and transmits the searched-out metadata to the file reference processor 8112 (S1813).

Next, based on the result of the metadata search, the file reference processor 8112 determines whether a file entity exists in the first storage apparatus 10 or not (S1813). If the file exists in the storage apparatus 10 (S1813: YES), the processing proceeds to S1814 to acquire the file from the first storage apparatus 10, and then the processing ends. If the file does not exist in the first storage apparatus 10 (S1813: NO), the processing proceeds to S1815.

In S1815, based on the result of the metadata search, the file reference processor 8112 determines whether a stub exists in the storage apparatus 10 (first storage apparatus 10) or not. If the stub does not exist in the storage apparatus 10 (S1815: NO), the processing proceeds to S1816 to perform error processing (e.g., to transmit, to the client device 3, an indication that the file does not exist), and then the processing ends. If the stub exists in the first storage apparatus 10 (S1815: YES), the processing proceeds to S1817.

In S1817, the file-entity reception processor 8123 transmits a file acquisition request to the file-entity transmission processor 8124 of the second server system 2. In S1818, the file-entity reception processor 8123 receives a file entity. In S1819, the file reference processor 8112 transmits the file to the client device 3 that has transmitted the reference request.

Figure 19:
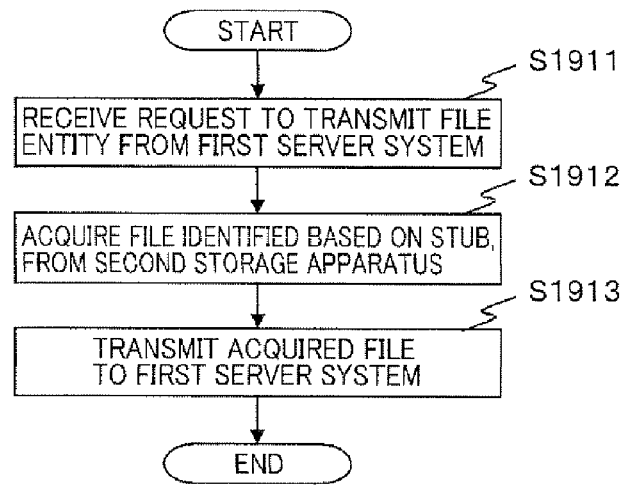
FIG. 19 is a flowchart illustrating processing performed by a second server system 2 in the file reference processing.

FIG. 19 is a flowchart illustrating processing performed by the server system 2 (second server system 2) in the file reference processing shown in FIGS. 15 and 17.

The file-entity transmission processor 8124 of the second server system 2 receives a file acquisition request from the file-entity reception processor 8123 of the first server system 2 (S1911). In response to the acquisition request, the file-entity transmission processor 8124 transmits the acquisition request to the file acquisition processor 8114 of the second server system 2. Then, the file acquisition processor 8114 acquires the file stored in the second storage apparatus 10, and passes the file to the file-entity transmission processor 8124 (S1912). The file-entity transmission processor 8124 transmits the passed file to the file-entity reception processor 8123 of the first server system 2 (S1913).

<Migration>

Next, a description is given of a migration function implemented by the function of the migration processor 815 of the server system 2. Note that, as is described below, the server system 2 of the present embodiment includes a function of executing file (data) migration (data migration) between different virtual servers 810 in the same server system 2, and a function of executing file (data) migration between virtual servers 810 in respective different server systems 2.

Figure 20:
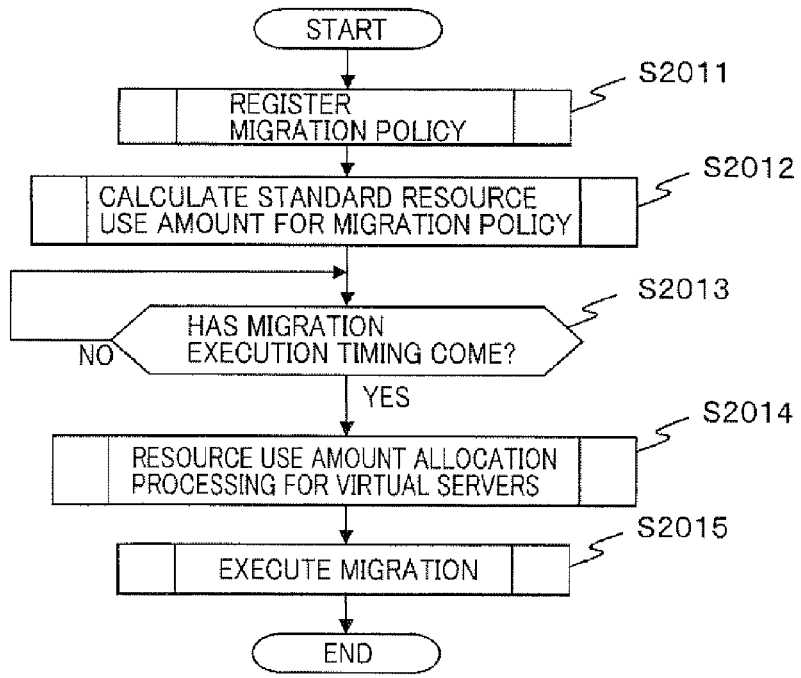
FIG. 20 is a flowchart illustrating an execution way of migration.

FIG. 20 is a flowchart illustrating how to execute migration, which is performed using the function of the migration processor 815 of the server system 2. The server system 2 has the following mechanism implemented when executing migration. Specifically, with the mechanism, the server system 2 controls an amount of resources of the server system 2 to be allocated between the virtual servers 810 involved with the migration so as to optimize overall migration performances of the information processing system 1. Note that the resources include, for example, the CPU 21, the memory 22 (especially, a memory storage area of the cache memory used as a buffer when data is transmitted or received between the virtual servers 810), the LAN adapter 261, the FC adapter 262, and the like of the server system 2.

As shown in the drawing, to execute migration, first, a user operates the client device 3 and thereby defines a migration policy (S2011).

FIG. 21 is an example of a screen displayed, for the definition, by the migration policy definer 911 of the client device 3 (called a migration policy definition screen 2100 below). The migration policy definition screen 2100 shown in the drawing has a policy ID display field 2111, a policy name display field 2112, a migration-source setting field 2113, a migration-destination setting field 2114, an execution schedule setting field 2115, a search condition setting field 2116, a registration button 2117, and a cancel button 2118.

In the migration-source setting field 2113, an identifier of a migration-source server system 2 and an identifier of a virtual server 810 are set. In the migration-destination setting field 2114, an identifier of a migration-destination server system 2 and an identifier of a virtual server 810 are set. In the execution schedule setting field 2115, a schedule for migration execution is set. In the search condition setting field 2116, a search condition used to select a migration-target file is set. Setting of a search condition in this field allows a user to narrow down files to a migration-target file.

A migration policy defined using the migration policy definition screen 2100 is sent to each of the server systems 2 (server systems 2 involved with the migration defined by the migration policy) via the communication network 5, and the migration processor 815 of each of those server systems 2 holds the migration policy as a table.

FIG. 22 is an example of the table held by the migration processor 815 (called a migration policy table 2200 below). As shown in the drawing, the migration policy table 2200 includes one or more records each having the following items: a policy ID 2211 in which an identifier of a migration policy is set; a migration source 2212 in which an identifier of a migration-source virtual server 810 is set; a migration destination 2213 in which an identifier of a migration-destination virtual server 810 is set; a priority level 2214 in which a execution priority level among migration policies is set; a migration condition 2215 in which a search condition designated in the search condition setting field 2116 of the migration policy definition screen 2100 is set; and a migration schedule 2216 in which a migration execution schedule designated in the execution schedule setting field 2115 of the migration policy definition screen 2100 is set.

S2012 in FIG. 20 is processing for the migration optimization mentioned earlier, and is performed by the migration processor 815 of the server system 2. For each of the migration policies registered in the migration policy table 2200, the migration processor 815 obtains an amount of resources to be used by the virtual server 810 and the server system 2 when the migration policy is performed, in accordance with the size of data files. This processing will be described in detail later.

In S2013 in FIG. 20, the migration execution manager 8152 checks a current time and date acquired by the timer device 27 against the content of the migration schedule 2216 of each of the migration policies in the migration policy table 2200 to determine whether a migration execution timing has come or not. When an execution timing of any migration policy has come (S2013: YES), the processing proceeds to S2014. Note that the server system 2 and the storage apparatus 10 perform processing for regular task services (e.g., such as daytime online task processing and nighttime batch task processing) while migration is not executed.

S2014 in FIG. 20 is processing for the migration optimization, and is perfoiined by the migration processor 815 of the server system 2. The migration processor 815 deterrnines an amount of resources to be allocated between the virtual servers 810 and used during migration execution. This processing will be described in detail later.

In S2015, the migration execution processor 815 of the server system 2 executes migration. Note that the amount of resources usable for the migration by each of the virtual servers 810 is limited within the resource amount determined in S2014 during the migration execution. This processing will be described in detail later.

<Migration Policy Definition Processing>

Figure 23:
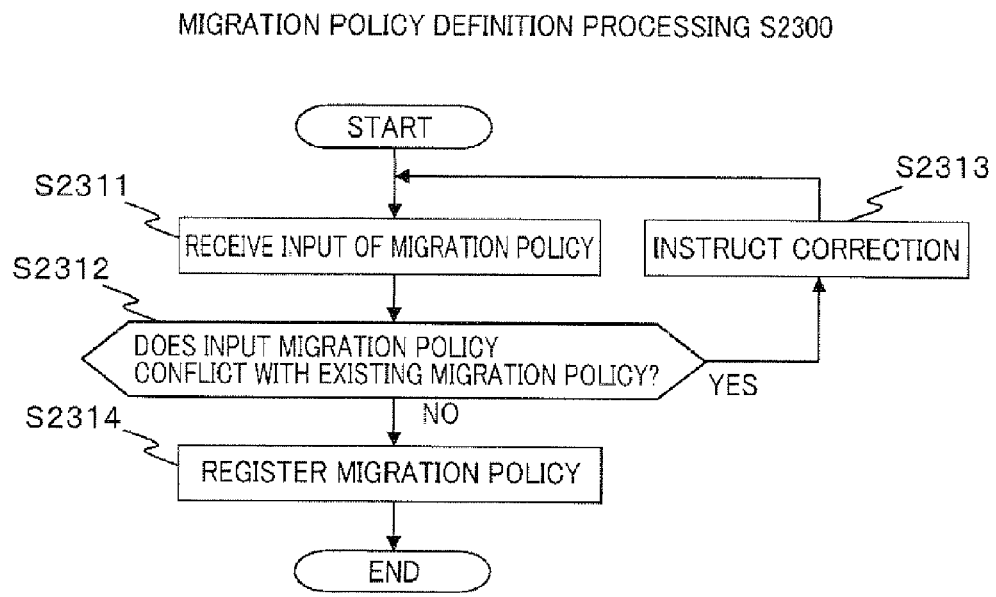
FIG. 23 is a flowchart illustrating migration policy definition processing s2300.

FIG. 23 is a flowchart illustrating the processing performed in S2011 in FIG. 20 (called migration policy definition processing S2300 below). The migration policy definition processing S2300 is described below with the drawing.

Upon receipt of input of a migration policy from a user (S2311), the migration policy definer 911 of the client device 3 determines whether the input migrating policy conflicts with an existing migration policy (S2312). Note that the conflict occurs when, for example, a certain file is a migration target for multiple migration policies. When the conflict occurs (S2312: YES), a screen instructing correction is displayed (S2313), and the processing returns to S2311. When no conflict occurs (S2312: NO), the processing proceeds to S2314.

In S2314, the migration policy definer 911 transmits the migration policy that the user has set, to a corresponding server system 2 via the communication network 5. Note that the server system 2 holds the migration policy transmitted from the client device 3 as the migration policy table 2200.

<Processing for Calculating Standard Resource Use Amount for Migration Policy>

Figure 24:
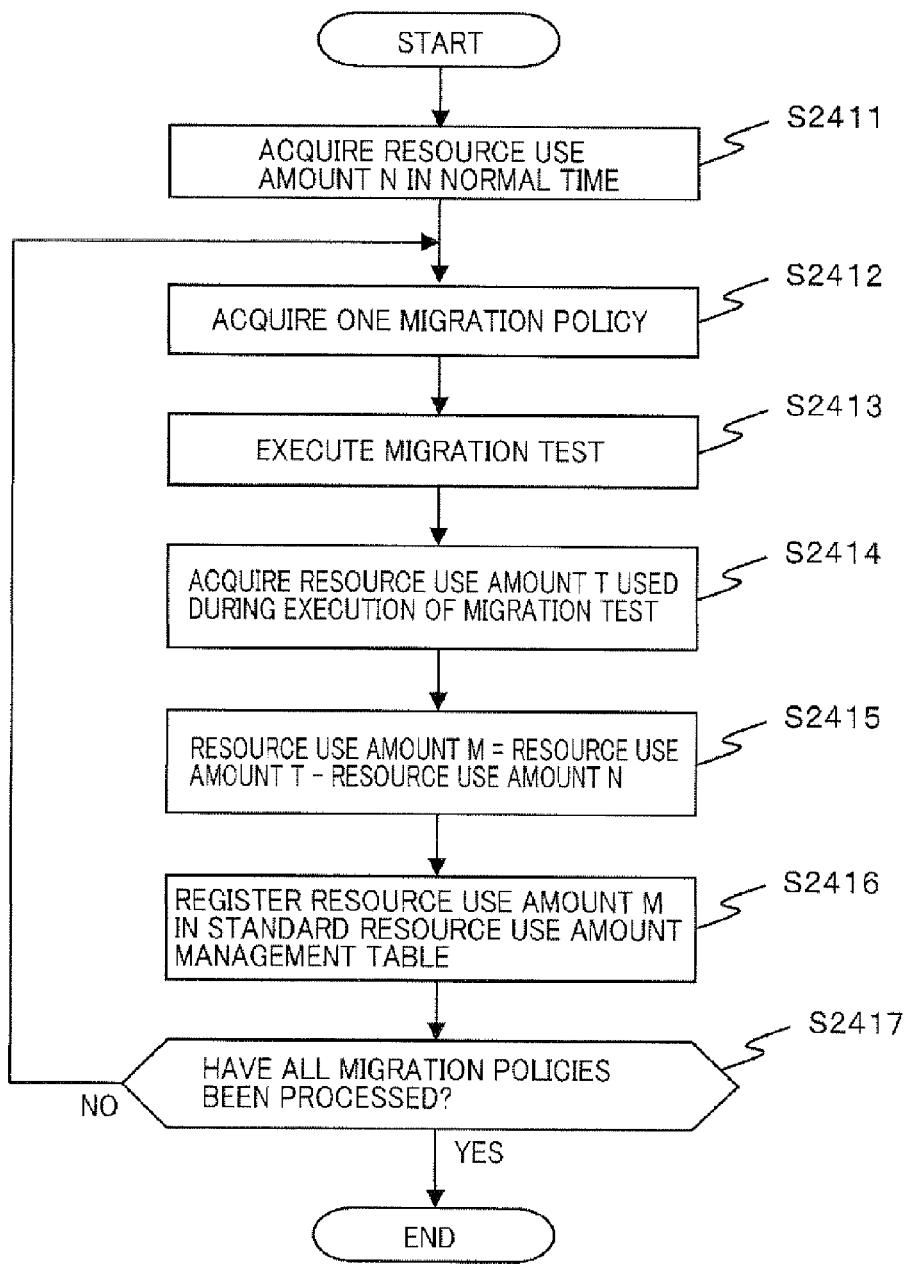
FIG. 24 is a flowchart illustrating standard resource use amount calculation processing S2400.

FIG. 24 is a flowchart illustrating the processing performed in S2012 in FIG. 20 (called standard resource use amount calculation processing S2400 below). The standard resource use amount calculation processing S2400 is described below with the drawing.

First, from the resource monitor 821 of the server system 2, the migration processor 815 of the server system 2 acquires an amount of resources of the server system 2 used in a period when migration is not executed (called a normal time below) (such resource use amount is called a resource use amount N below) (S2411).

Next, the migration processor 815 acquires one migration policy (record) from the migration policy table 2200 (S2412). Then, the migration processor 815 executes a migration test (load measurement) using test data stored in the storage apparatus 10 in advance (S2413).

Figures 25, 26:
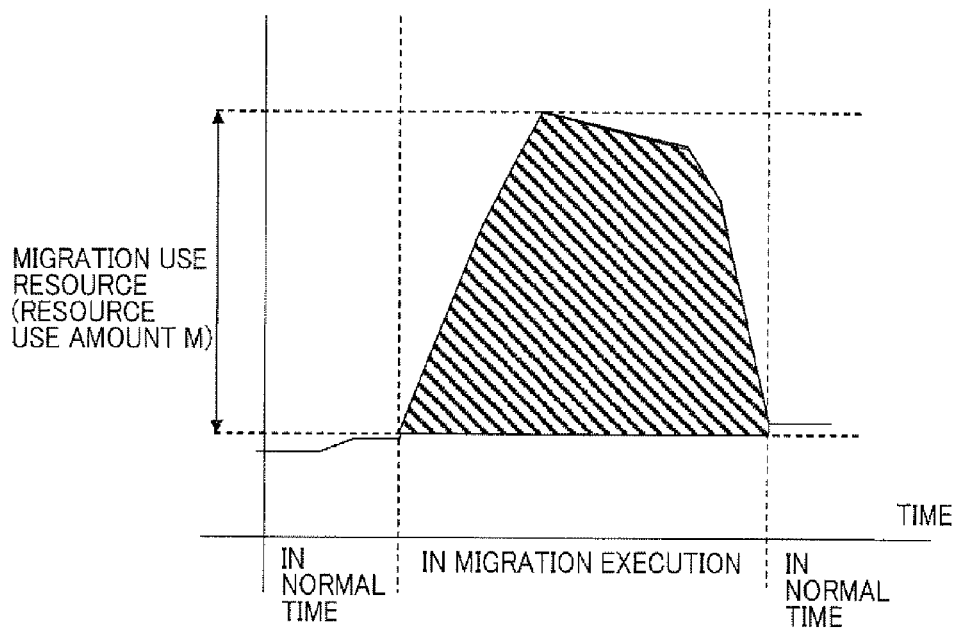
FIG. 25 is an example of test data.
FIG. 26 is a graph showing a change in a use amount of resources of the server system 2.

FIG. 25 shows an example of test data (and information indicating the storage location of the test data). As shown in the drawing, multiple data sets having different data sizes (file sizes) are prepared in the storage apparatus 10.

Next, from the resource monitor 821, the migration processor 815 acquires an amount of resources used during the test execution (called a resource use amount T below) (S2414). Then, the migration processor 815 uses a difference between the resource use amount N and the resource use amount T (the resource use amount T—the resource use amount N) and thus obtains a resource use amount needed for the migration during the migration test period (such resource use amount is called a resource use amount M below) (S2415).

FIG. 26 is a graph showing the change in the use amount of resources of the server system 2. The hatched part in the drawing corresponds to the resource use amount M.

Figure 27:
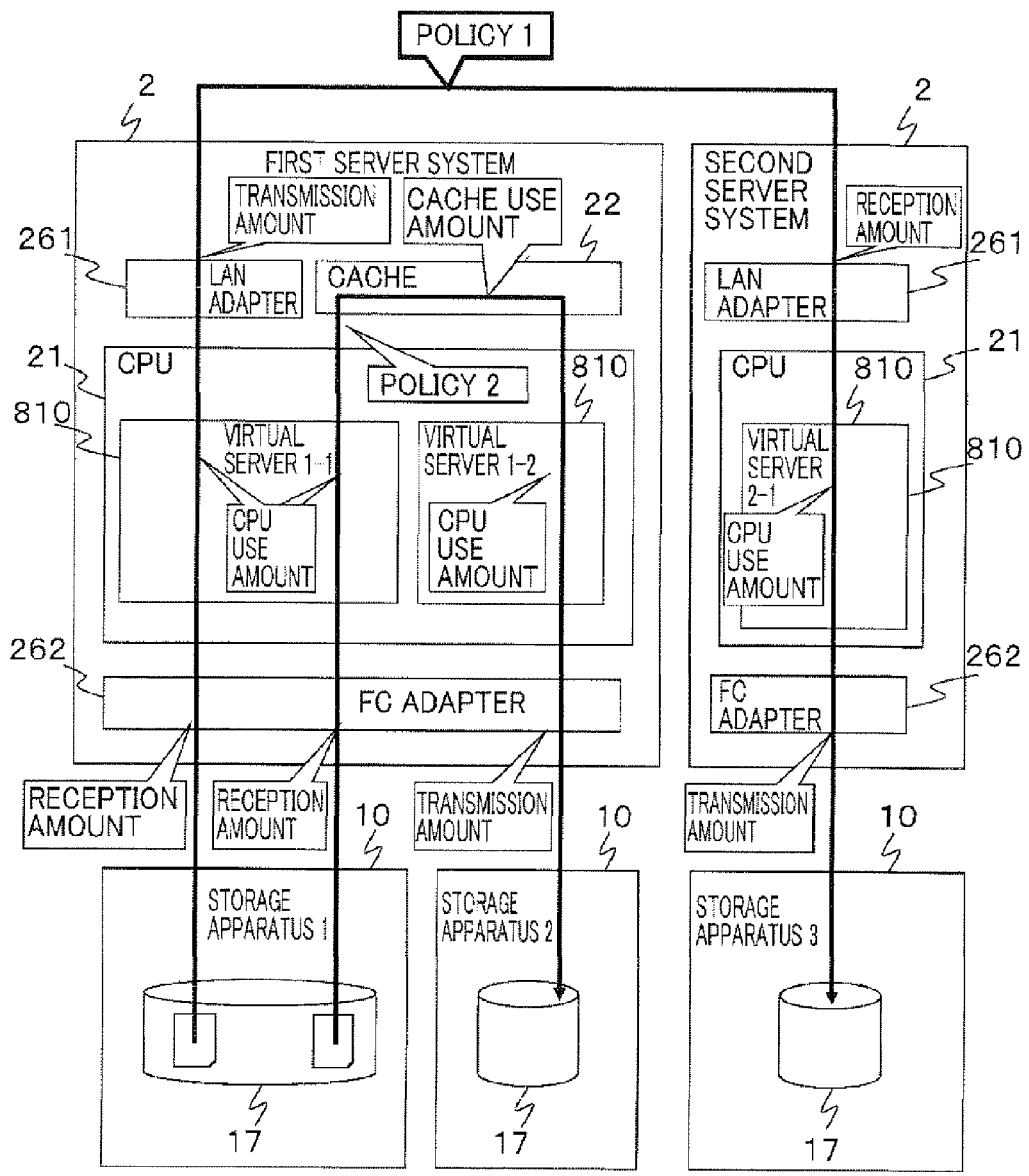
FIG. 27 is a schematic diagram illustrating resources used in migration execution.

FIG. 27 is a schematic diagram illustrating resources used in the migration execution.

In the drawing, "1-1" attached to the virtual server 810 denotes a first virtual server 810 of a first server system 2; "1-2", a second virtual server 810 of the first server system 2; and "2-1", a first virtual server 810 of a second server system 2. In other words, the number on the left of "-" specifies the server system 2, and the number on the right thereof specifies the virtual server 810.

When migration is executed between virtual servers 810 in the same server system 2, such as a case of migration from the virtual server 810 (1-1) to the virtual server 810 (1-2), resources of the server system 2 that are used are the FC adapter 262, the CPU 21, the memory 22 (cache memory), and the like. When migration is executed between virtual servers 810 of different server systems 2, such as a case of migration from the virtual server 810 (1-1) to the virtual server 810 (2-1), resources used are the FC adapter 262, the CPU 21, the LAN adapter 261, and the like.

Note that, when the resource is the CPU 21 for example, the resource use amount M is calculated for each process executed by the virtual server 810. When the resource is the memory 22, the resource use amount M is, for example, a memory use amount required for data transfer in the virtual server 810. When the resource is the LAN adapter 261 or the FC adapter 262, the resource use amount M is, for example, an amount of data transmitted from the migration source or an amount of data received by the migration destination.

In S2416 in FIG. 24, the migration processor 815 registers the obtained resource use amount M in a table held by the server system 2 (called a standard resource use amount management table 2800 below) as a standard resource use amount (S2146).

FIG. 28 is an example of a content registered in the standard resource use amount management table 2800. The drawing shows a case where test data is 1 kB. In practice, the test is performed also for test data sets having various data sizes such as 100 kB and 1 MB. Then, as shown in FIG. 29, interpolation processing is performed based on discrete values for 1 kB, 100 kB, 1 MB, and the like, and a standard resource use amount is obtained based on the successive data sizes.

In S2417 in FIG. 24, the migration processor 815 determines whether all the migration policies in the migration policy table 2200 have been processed or not. When there is an unselected migration policy (S2417: NO), the processing returns to S2412 to perform processing for the unprocessed migration policy. When all the migration policies have been processed (S2417: YES), the processing ends.

Figure 30:
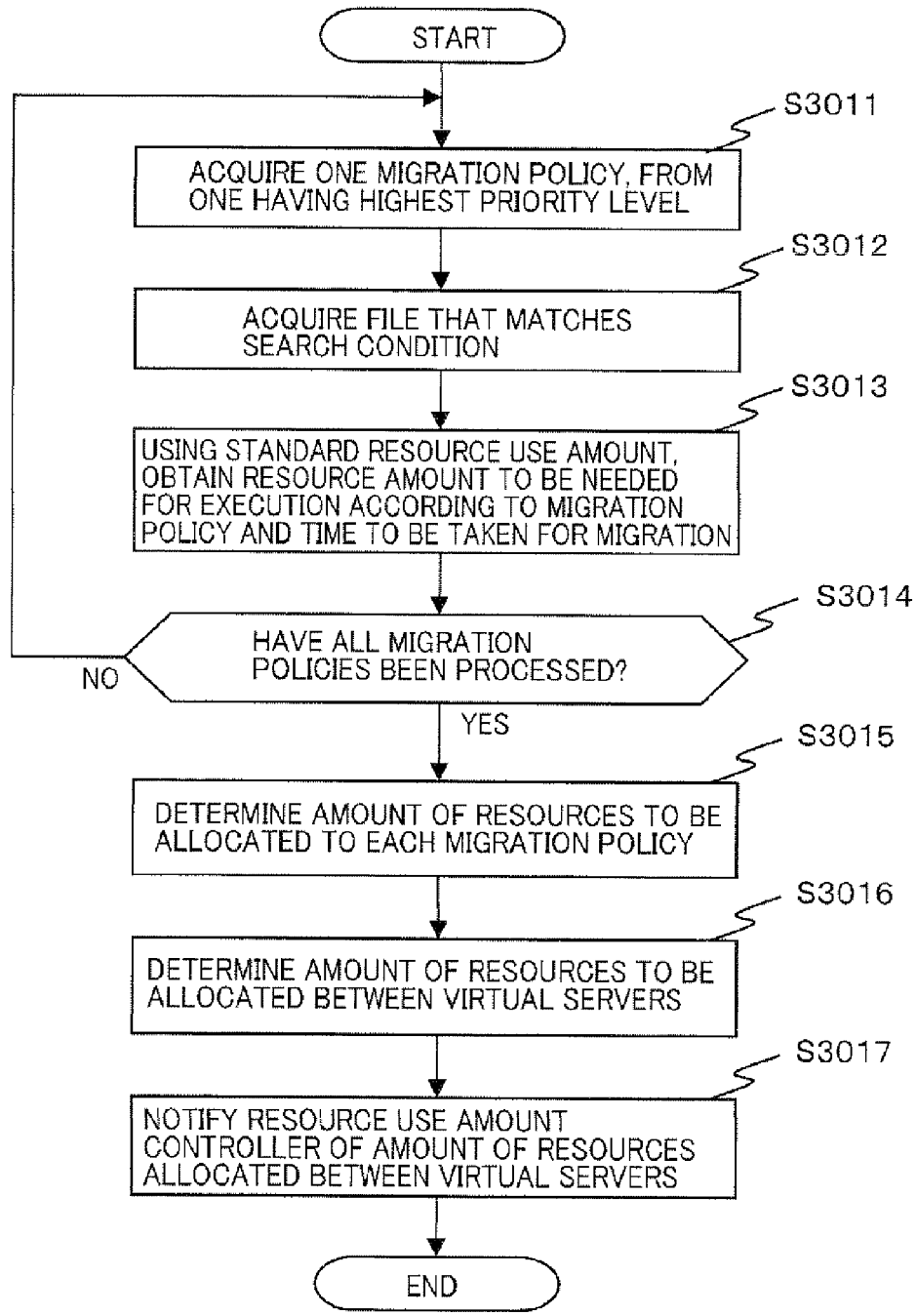
FIG. 30 is a flowchart illustrating processing performed in S2014 in FIG. 20 (resource use amount allocation processing S3000 for virtual servers).

FIG. 30 is a flowchart illustrating the processing performed in S2014 in FIG. 20 (called resource use amount allocation processing S3000 for virtual servers below). The resource use allocation processing S3000 is described below with the drawing.

First, the migration processor 815 of the server system 2 acquires one migration policy from the migration policy table 2200 (S3011) from the one having the highest execution priority level (the content of the priority level 2214).

Note that the execution priority level can be set according to various applications and purposes. For example, when the storage apparatuses are managed by a hierarchy (Tiered Storage), the execution priority level can be set according to the hierarchy of a migration-destination storage apparatus. This hierarchy includes, for example, Tier1 (a highly reliable group of the storage apparatuses using, for example, Fibre Channel), Tier2 (a large-capacity, low-cost group of the storage apparatuses in which data used mainly for reuse after the actual operation (mainly, search and reference) are saved), Tier 3 (an infrequently-accessed group of the storage apparatuses which is normally offline, such as a storage apparatus expressly meant for tape drive and archive).

Next, the migration processor 815 acquires a file that matches a search condition (the content of the migration condition 2215) (called a migration-target file below) and the data size of each migration target file from the storage apparatus 10, and then outputs the file and the data size to a table (S3012). FIG. 31 shows an example of the output table (called a migration-target file management table 3100 below).

Next, based on the data size of each migration-target file and the content of the standard resource use amount management table 2800, the migration processor 815 obtains, for each acquired migration policy, an amount of resources necessary for executing migration (called a necessary resource amount below) and a time to be taken by the migration (called an execution time below) (S3013). FIG. 32 shows an example of the necessary resource amount and the execution time obtained in S3013. Note that "MI" in the drawing indicates an instruction count (Mega Instruction).

In S3014, the migration processor 815 determines whether all the migration policies in migration policy table 2200 have been processed or not. If not all the migration policies have been processed (S3014: NO), the processing returns to S3011 to perform processing for the unprocessed migration policy. When all the policies have been processed (S3014: YES), the processing proceeds to S3015.

In S3015, the migration processor 815 determines an amount of resources to be allocated to each of the migration policies, based on the necessary resource amount and the execution time of each of the migration policies. Then, the migration processor 815 further apportions the amount of resources allocated to each of the migration policies, between the virtual servers 810 (S3016).

The above processing is described in detail using a concrete example. FIG. 33 is an example of a table with which a resource amount of each of the server systems 2 is managed and which is held by each server system 2 (called a resource management table 3300 below). The migration processor 815 acquires the resource amount of each server system 2 from the table.

FIG. 34 shows an example of resource allocation performed when the resource is the CPU 21 (such a table as shown in the drawing with which resource allocation between the virtual servers 810 is managed is called a resource amount allocation management table 3400 below). In this example, the resource amount "200" of the CPU 21 of the server system 2 is apportioned for each of the migration policies with a ratio of necessary resource amounts for the CPU 21 of the server system 2 shown in FIG. 32 (400,000 (MI): 100,000 (MI): 200,000 (MI)) to allocate the resources of the CPU 21 to each of the migration policies (S3015). Specifically, the migration policy having a policy ID of "1" is allocated 114 MIPS; the migration policy having a policy ID of "2," 29 MIPS; and the migration policy having a policy ID of "3," 57 MIPS. Note that the resource allocation to each of the migration policies may be determined so that the execution time for each of the policies becomes equal.

In the drawing, the resources of the CPU 21 allocated to the migration policy having a policy ID of "1," namely 114 MIPS, are further allocated equally between the virtual server 810 (1-1) and the virtual server 810 (1-2) that are involved with this migration policy (57 MIPS each).

Further, the resources of the CPU 21 allocated to the migration policy having a policy ID of "2," namely 29 MIPS, are all allocated to the virtual server 810 (1-1) involved with this migration policy.

Furthermore, the resources of the CPU 21 allocated to the migration policy having a policy ID of "3," namely 57 MIPS, are all allocated to the virtual server 810 (1-2) involved with this migration policy.

In S3016, the migration processor 815 notifies the resource use amount controller 816 of the allocated resource amount of each of the virtual servers 810.

<Migration Processing>

Figure 35:
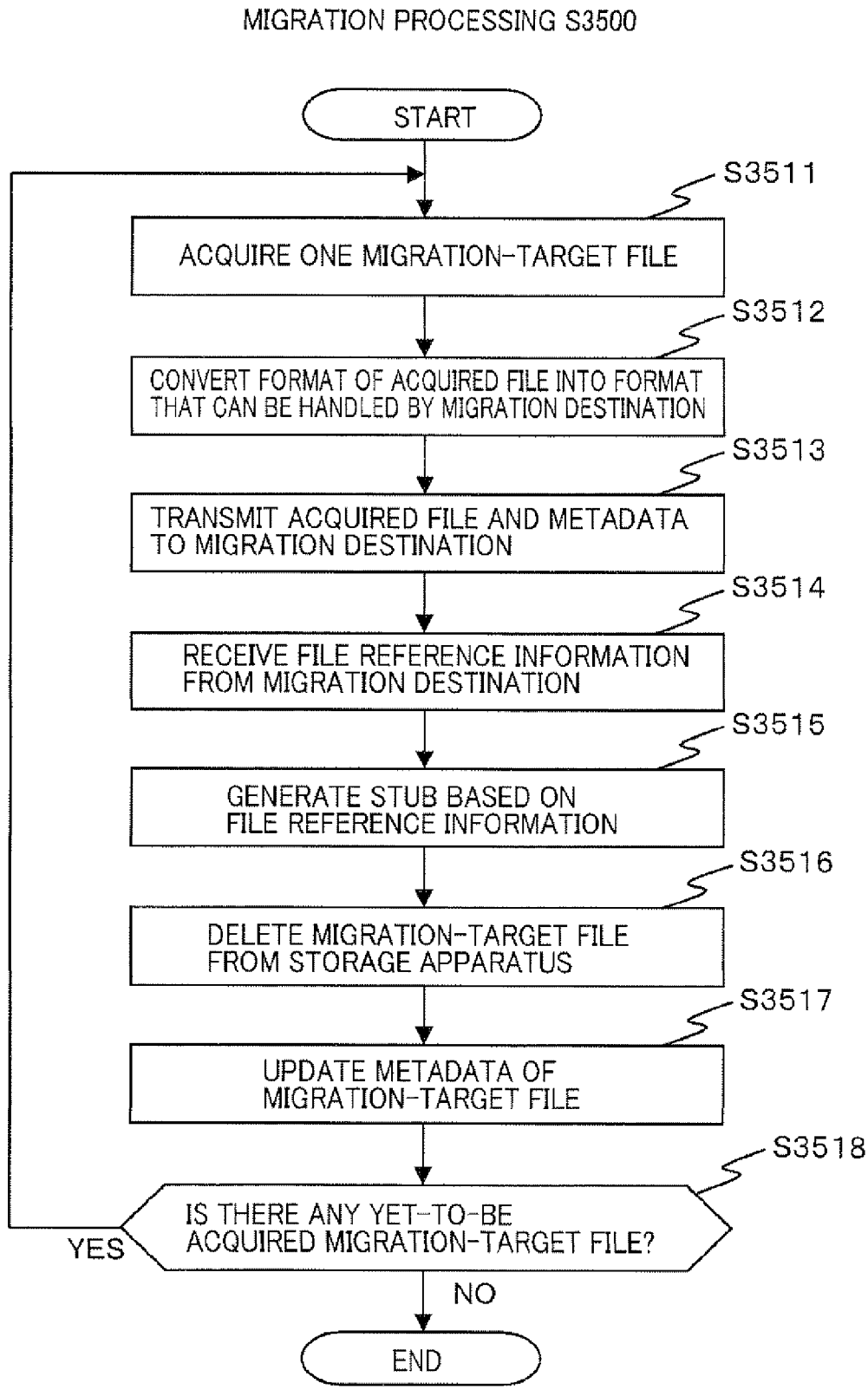
FIG. 35 is a flowchart illustrating migration processing S3500.
Figure 36:
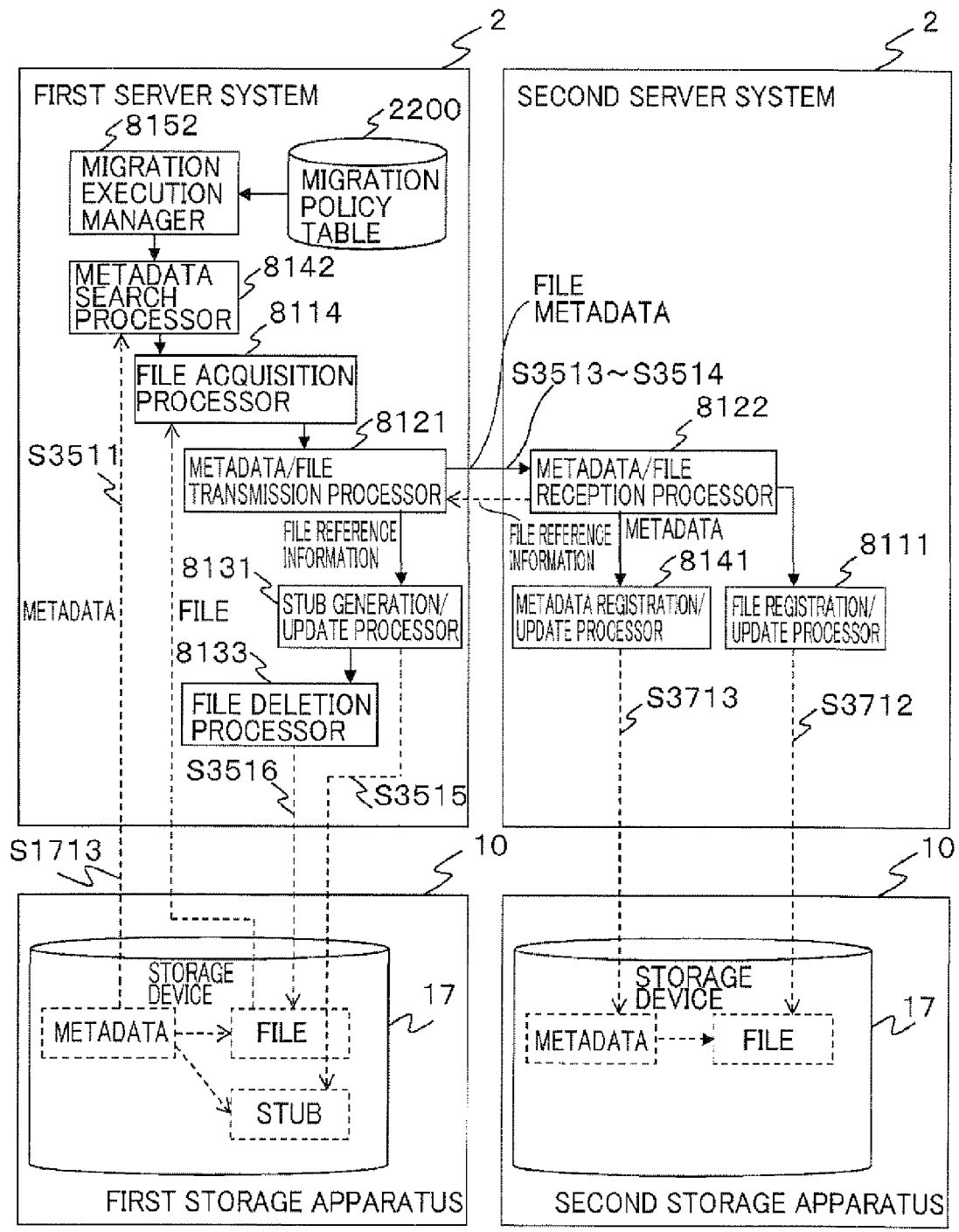
FIG. 36 is a diagram illustrating an overview of the migration processing S3500.

FIG. 35 is a flowchart illustrating details of the processing performed in S2015 in FIG. 20 (called migration processing S3500 below). In addition, FIG. 36 is a diagram illustrating an overview of the migration processing 3500 (including migration-destination processing S3700 to be described later).

The migration processor 815 acquires one migration-target file that matches a search condition (the content set in the migration condition 2215) as well as its metadata from the migration-source storage apparatus 10 (S3511).

Next, the migration processor 815 converts the data format (file format) of the acquired file and metadata into the format that can be handled by the migration-destination server system 2 (S3512). If the migration-destination storage apparatus 10 is designed to store files in archive format, this data format conversion involves conversion into archive format. Note that the conversion may be performed by the migration-destination server system 2.

Next, the migration processor 815 transmits the file and metadata that have been subjected to the data format conversion, to the migration-destination server system 2 (S3513). Then, in response to the file transmission, information which indicates the storage destination of the file (called file reference information below) is transmitted from the migration-destination server system 2, and the migration processor 815 receives that file reference information (S3514).

Next, the migration processor 815 generates a stub for the migration-target file, based on the file reference information (S3515). Then, the migration processor 815 deletes the migration-target file from the migration-source storage apparatus 10 (S3516), and updates the metadata of the migration-target file stored in the migration-source storage apparatus 10.

In S3518, the migration processor 815 determines whether or not there is any migration-target file yet to be acquired in S3511. When there is any yet-to-be acquired migration-target file (S3518: YES), the processing returns to S3511. When there is no yet-to-be acquired migration target file (S3518: NO), the processing ends.

Note that whether migration should be executed by duplication or by move (whether the file in the migration source should remain in the migration-source storage apparatus 10 after the migration) can be designated using, for example, the migration policy definition screen 2100 shown in FIG. 21. In this case, a designation content (duplication or move) is recorded in the migration policy, and the above-described processing in S3516 (deletion of a migration-target file) is not performed.

In general, the stub generated when a file entity is deleted has a much smaller data size than the file entity. For this reason, when numerous stubs are backed up on a file basis, processing for identifying the storage location of each file, processing for opening and closing a file, and the like are performed as many times as the number of files. Consequently, the backup takes a long time. To avoid this, for example, the stubs are managed in bulk in a specific logical volume. This allows the stubs to be backed up using a block transfer scheme on a logical volume basis, enabling high-speed backup acquisition by a backup medium such as a magneto-optical disk or a tape drive. Usually, a stub is accessed only at the time of migration. With the above-described way, the stub backup can be acquired at any time during the time when migration is not executed. Note that, to implement such mechanism, information identifying a logical volume to be a sub storage destination is stored in the server system 2 in advance for example, and a stub generated in the processing performed in S3515 may be stored in that logical volume.

There is a case where the server system 2 provides a logical volume created using thin provisioning, for management of files (data) using the storage apparatus 10 (generation, update, and deletion of files stored in the storage apparatus 10). In this case, when a file entity is deleted due to migration, and a stub is generated (S3515, S3516), an unused area is generated in the logical volume. Leaving this area unused causes reduction in an effective storage area. Accordingly, it is preferable that, when a file entity is deleted due to migration and a stub is generated, the file deletion processor 8113 or the like of the virtual server 810 issue a command to release an unused area, so as to achieve complete releasing of an unused area in a logical volume. Note that the details of the unused area release are described in, for example, Japanese Patent Application laid-open Publication No. 2007-257317.

Figure 37:
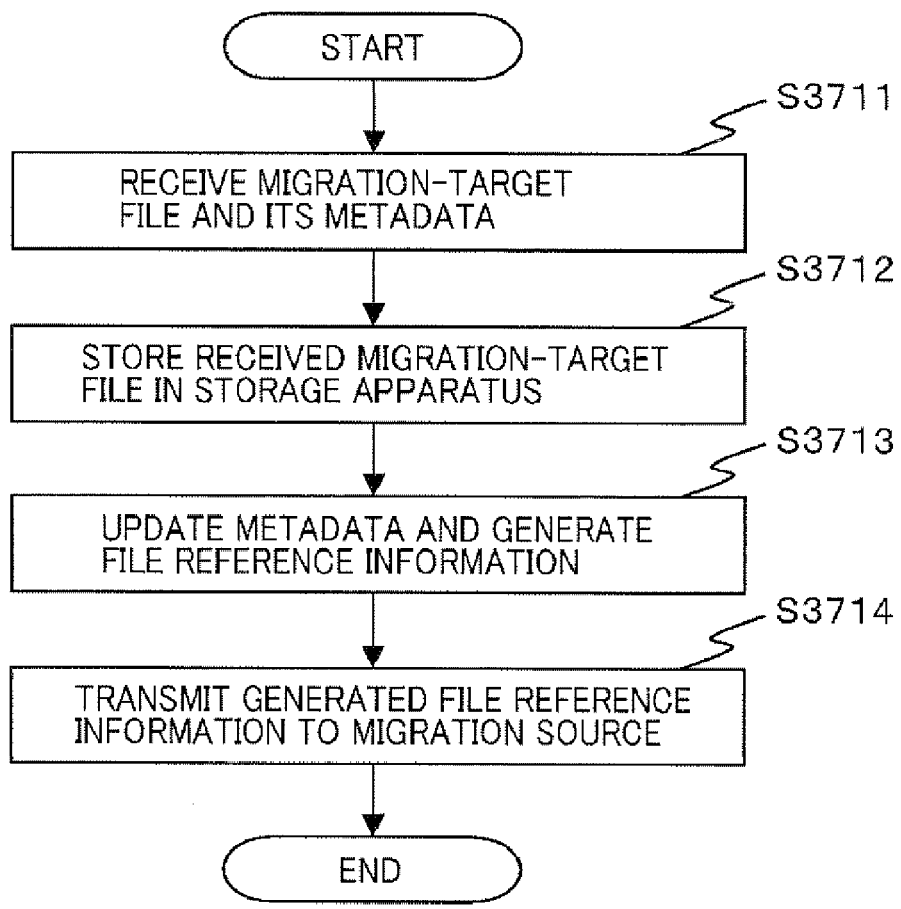
FIG. 37 is a flowchart illustrating migration-destination processing S3700.

FIG. 37 is a flowchart illustrating details of processing performed by a migration-destination server system 2 at the time of the migration processing S3500 in FIG. 35 (called migration-destination processing S3700 below).

Upon receipt of the migration-target file and its metadata transmitted from the migration-source server system 2 in 5351.3 in FIG. 35 (S3711), the migration-destination server system 2 stores the received migration-target file and metadata in the migration-destination storage apparatus 10 (S3712).

Next, the migration-destination server system 2 updates the metadata of the migration-target file and generates file reference information (S3713). The migration-destination server system 2 then transmits the generated file reference information to the migration-source server system 2 (S3714).

The migration processing S3500 and the migration-destination processing S3700 described above are performed so that an amount of resources used therefor does not exceed the limitation of the resource amount allocated in the resource use allocation processing S3000 for virtual servers described in FIG. 30 and the like. Specifically, the resource use amount allocator 822 of each server system 2 monitors an amount of resources used by each of the virtual servers 810, which is acquired by the resource monitor 821 in real time, and performs control so that each virtual server 810 performs processing within the resource amount allocated thereto.

Figure 38:
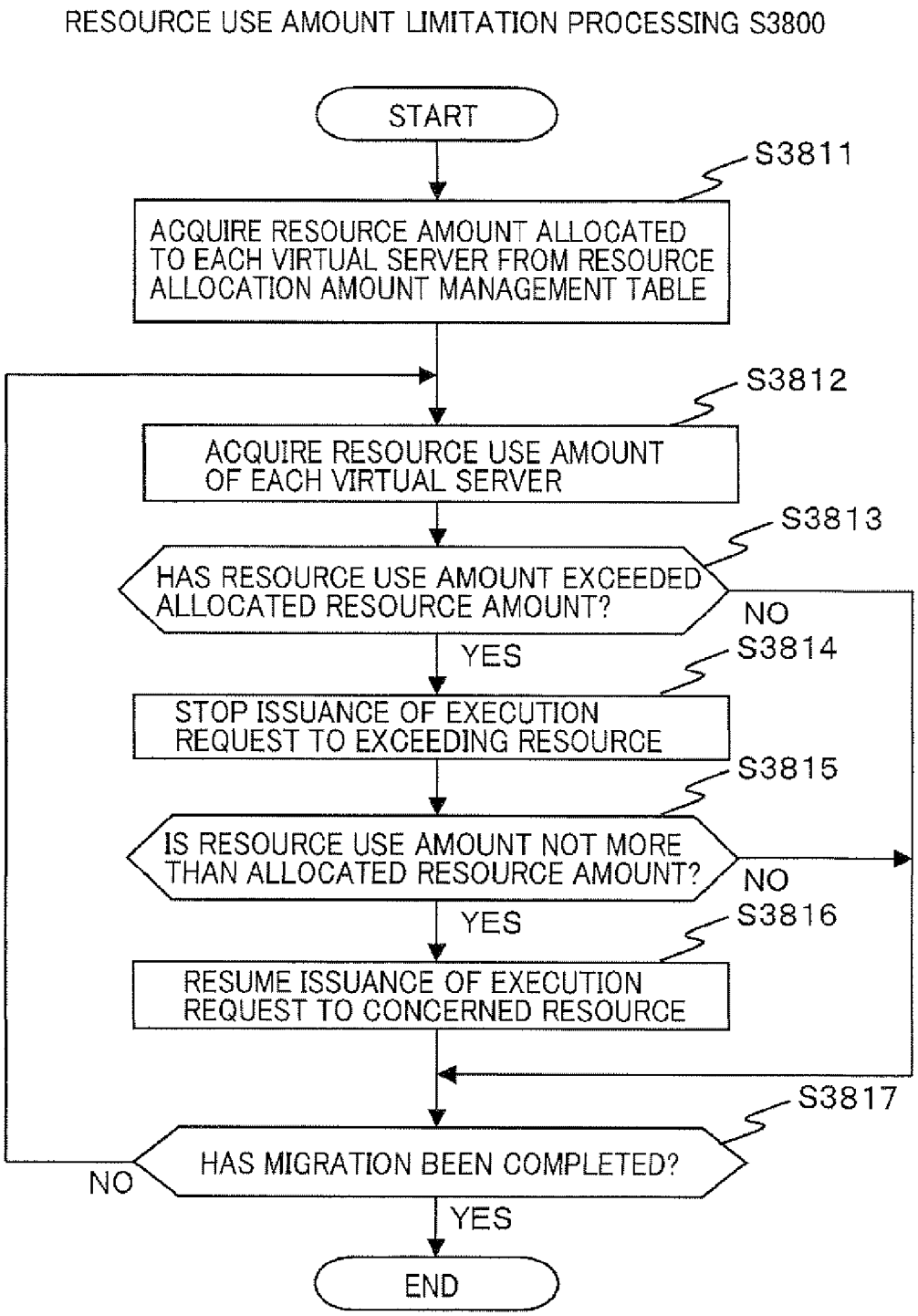
FIG. 38 is a flowchart illustrating resource use amount limitation processing S3800.

FIG. 38 is a flowchart illustrating processing performed by the server system 2 for this control (called resource use amount limitation processing S3800 below).

Prior to executing migration, the resource use amount allocator 822 of the server system 2 acquires an allocated resource amount of each of virtual servers 810, from the resource allocation amount management table 3400 (S3811). Note that, during a period when migration is not executed (at the time of normal processing), resources are allocated between the virtual servers 810 according to a pre-designated allocation amount. FIG. 39A shows an example of resource allocation to each virtual server 810 in the normal processing. In addition, FIG. 39B shows an example of how the server system 2 allocates resources between the virtual servers 810 in the normal processing.

After the migration starts, the resource use amount allocator 822 of the server system 2 acquires an amount of resources being used by each virtual server 810 from the resource monitor 821, and monitors, in real time, whether or not the resource use amount of each virtual server 810 exceeds a resource amount allocated to the virtual server 810 (S3812, S3813). When the resource use amount exceeds the allocated amount (S3813: YES), the processing proceeds to S3814, and when the resource use amount does not exceed the allocated amount (S3813: NO), the processing proceeds to S3817.

In S3814, the resource use amount allocator 822 stops issuance of an execution request to an exceeding resource. Note that the execution-request issuance stop may be issued to all the virtual servers 810, or execution-request issuance from some of the virtual servers 810 may be stopped. Moreover, the execution-request issuance stop may be issued to all the processes of the virtual servers 810, or may be issued to processes of some of the virtual servers 810.

In S3815, the resource use amount allocator 822 acquires a resource use amount of each virtual server 810 from the resource monitor 821, and determines whether or not the resource use amount of each virtual server 810 has fallen within its allocated resource use amount. When the resource use amount is within the allocated resource amount (S3815: YES), issuance of an execution request to the resource concerned is resumed (S3816). When the resource use amount still exceeds the allocated resource amount (S3815: NO), the processing proceeds to S3817. Note that the processing performed in S3812 and S3813 and the processing performed in S3815 and S3816 may be performed as processes independent of each other.

In S3817, the resource use amount allocator 822 determines whether the migration has been completed or not. If the migration has been completed (S3817: NO), the processing returns to S3812. If the migration has been completed (S3817: YES), the processing ends.

As described thus far, for each of multiple policies each defining an execution way of migration, the server system 2 obtains a resource use amount to be needed when the migration is executed according to that policy. Then, the server system 2 allocates an amount of resources of the server system to each migration policy, according to the use amount obtained for that policy. Then, when migration is to be executed according to a certain policy, the server system 2 allocates, between the virtual servers 810, a resource amount usable for execution of the migration, within the resource amount allocated to that certain policy. Accordingly, each policy is allocated a usable resource amount according to a load of migration performed according to that policy, allowing the policy to be allocated resources properly. This allows proper allocation of resources of the server system 2 between the virtual servers 810, thereby making smooth execution of migration possible.

Further, the server system 2 selects resources of the server system 2 to be allocated between the virtual servers 810, in accordance with a relationship between a migration-source virtual server 810 and a migration-destination virtual server 810 (whether the migration is executed between virtual servers 810 in the same server system 2, or between virtual servers 810 of different server systems 2). Then, the server system 2 allocates the selected resources between the virtual servers 810 properly. Accordingly, various resources of the server system 2 can be allocated properly between the virtual servers 810, according to a mode of migration.

Moreover, for each policy, the server system 2 stores, in advance, a resource use amount according to data size, to be used when migration is executed from a virtual server 810 to be a migration source to a virtual server 810 to be a migration destination. Then, for each of the policies, the server system 2 obtains a resource use amount to be needed in the migration executed according to the policy, based on the stored resource use amount according to data size. In this way, a resource use amount to be needed when migration is executed according to a certain policy can be obtained speedily, allowing smooth execution of migration.

Furthermore, for each policy, the server system 2 acquires the resource use amount according to data size, to be used when migration is executed from a virtual server 810 to be a migration source to a virtual server 810 to be a migration destination, by actually migrating test data according to the policy. Accordingly, a standard amount of resources used in the migration can be obtained accurately. Consequently, resources of the server system 2 can be properly allocated between the virtual servers 810.

\<Resource Re-Allocation\>

There is a case where, while migration is executed, an event which should be processed prior to the migration occurs (e.g., when a file registration/update/delete request is received from the client device 3, or when task processing to be processed promptly (on-line task, batch task) occurs). In this case, the server system 2 preferentially allocates resources for processing the event, and then re-allocates remaining resources between the virtual servers 810. After completion of the event processing, the server system 2 re-includes the resources that have been allocated for the event processing, as allocatable resources, and re-allocates resources between the virtual servers 810.

Figure 40:
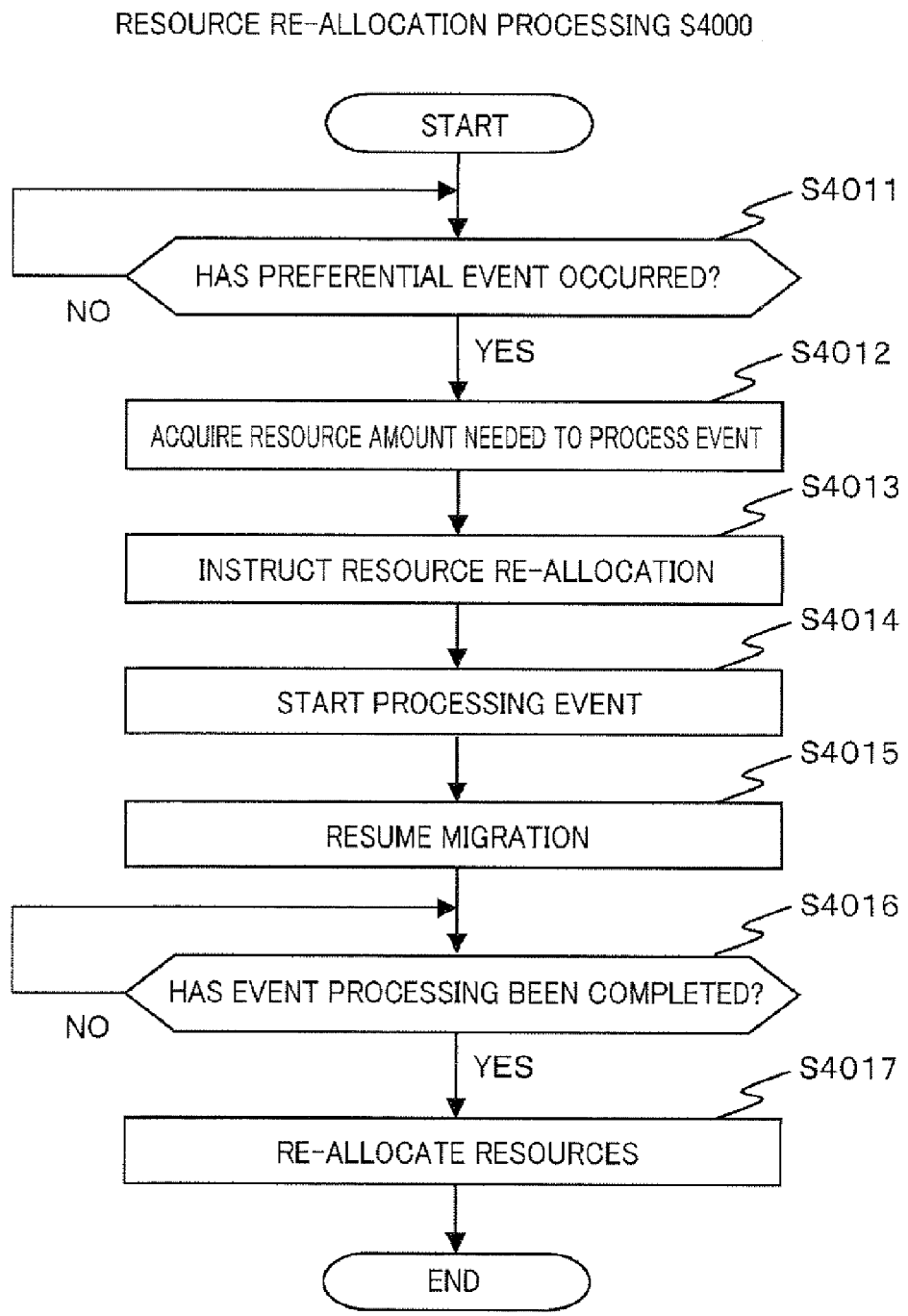
FIG. 40 is a flowchart illustrating resource re-allocation processing S4000.

FIG. 40 is a flowchart illustrating processing for such resource re-allocation (called resource re-allocation processing S4000 below). The resource re-allocation processing S4000 is described below with the drawing.

While migration is executed, the resource use amount allocator 822 of the server system 2 monitors, in real time, whether or not an event to be processed prior to the migration has occurred or not (S4011). When a preferential event occurs (S4011: YES), the processing proceeds to S4012. When a preferential event has not occurred (S4011: NO), the resource use amount allocator 822 continues the migration, maintaining the current allocation amount.

In S4012, the resource use amount allocator 822 acquires a resource amount needed to process the event. For the resource amount needed to process the event, an average resource amount for each event is stored in advance, for example. Next, the resource use amount allocator 822 instructs to re-allocate a resource amount between virtual servers 810, within a resource amount which is obtained by subtracting the resource amount acquired in S4012 (S4013). Next, the resource use amount allocator 822 starts processing the event (S4014).

In S4016, the resource use amount allocator 822 monitors whether the event processing has been completed or not. If the event processing has been completed (S4016: YES), the processing proceeds to S4017. In S4017, the resource use amount allocator 822 re-includes the resources that have been allocated for the event processing, as allocatable resources, and re-allocates resources between the virtual servers 810.

In this way, even when there is a change in an amount of resources of the server system 2 that are usable for migration due to a task-service load, an operation change, or the like, resources can be properly re-allocated between the virtual servers 810 involved with the migration without affecting task services.

The present embodiment has been described above. The above embodiment has been given to facilitate understanding of the present invention, and is not to be interpreted as limiting the present invention. The present invention can be changed or modified without departing from its spirit, and includes the equivalents thereof as well.

The invention claimed is:

1. A method for executing migration in an information processing system including:
   at least one server system that accesses a storage apparatus in response to a request transmitted from a client device; and
   a plurality of virtual servers which are implemented in the server system,
   the method allowing execution of migration between the plurality of virtual servers,
   the method allowing the server system to execute the steps of:
   storing an amount of resources of the server system that are usable for executing migration,
   storing a plurality of policies each defining how to execute a corresponding one of a plurality of migrations, and including information for specifying a resource use amount of the server system to be used to execute the migration,
   for each of the policies, obtaining the resource use amount needed to execute the migration according to the policy, allocating an amount of usable resources to each of the policies in accordance with the resource use amount obtained for the policy, in the migration according to each of the policies, allocating a certain amount of resources usable for executing the migration, to the virtual server which serves as either of a migration destination and a migration source, the certain amount of resources being determined within the amount of resources allocated to the policy, and
   executing the migration according to each of the policies in accordance with the resource use amount allocated to the policy,
   wherein the information for specifying a resource use amount of the server system to be used to execute the migration includes any one of the number of data to be moved in the migration and a data size of the data to be moved.

2. The method for executing migration according to claim 1, wherein the server system includes a CPU, a memory, a first communication adapter for communicating with another server system, and a second communication adapter for communicating with the storage apparatus, if the virtual server serving as a data migration source and the virtual server serving as a data migration destination in the execution of the migration exist in the same server system, the resources allocated between the virtual servers include the CPU, the memory, and the second communication adapter,
   if the virtual server serving as a data migration source and the virtual server serving as a data migration destination in the execution of the migration exist in the different server systems, respectively, the resources allocated between the virtual servers include the CPU, the first communication adapter, and the second communication adapter, for each of the policies, the server system pre-stores the resource use amount according to data size of data to be moved in the migration from the virtual server serving as a data migration source to the virtual server serving as a data migration destination,
   for each of the policies, the server system obtains the resource use amount needed to execute the migration according to the policy, based on the pre-stored resource use amount according to data size, the server system obtains the resource use amount according to data size needed to execute the migration from the virtual server serving as a data migration source to the virtual server serving as a data migration destination, by actually migrating test data there between according to the policy,
   the information for specifying a resource use amount of the server system to be used to execute the migration includes any one of the number of data to be moved in the migration and a data size of the data to be moved,
   when the amount of resources of the server system usable for executing migration changes during the migration, the server system changes the amount of resources allocated between the virtual servers within the amount of resources of the server system after the change, by re-executing the step of allocating an amount of usable resources to each of the policies in accordance with the resource use amount obtained for the policy, and the step of, in the migration according to each of the policies, allocating a certain amount of resources usable for executing the migration, to the virtual server which serves as either of a migration destination and a migration source, the certain amount of resources being determined within the amount of resources allocated to the policy, each of the virtual servers has a file system, the storage apparatus has a function of backing up data using a block transfer scheme on a logical volume basis, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, the virtual server stores the stub in a specific logical volume in the storage apparatus, the server system provides a virtual volume created using thin provisioning, for management of data in the storage apparatus, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, and in the deletion of the file entity, the virtual server issues a command to release a storage area of the logical volume previously used to store the file entity thus deleted.

3. The method for executing migration according to claim 1, wherein the server system includes a CPU, a memory, a first communication adapter for communicating with another server system, and a second communication adapter for communicating with the storage apparatus, if the virtual server serving as a data migration source and the virtual server serving as a data migration destination in the execution of the migration exist in the same server system, the resources allocated between the virtual servers include the CPU, the memory, and the second communication adapter, and if the virtual server serving as a data migration source and the virtual server serving as a data migration destination in the execution of the migration exist in the different server systems, respectively, the resources allocated between the virtual servers include the CPU, the first communication adapter, and the second communication adapter.

4. The method for executing migration according to claim 1, wherein for each of the policies, the server system pre-stores the resource use amount according to data size of data to be moved in the migration from the virtual server serving as a data migration source to the virtual server serving as a data migration destination, and for each of the policies, the server system obtains the resource use amount needed to execute the migration according to the policy, based on the pre-stored resource use amount according to data size.

5. The method for executing migration according to claim 4, wherein the server system obtains the resource use amount according to data size needed to execute the migration from the virtual server serving as a data migration source to the virtual server serving as a data migration destination, by actually migrating test data there between according to the policy.

6. The method for executing migration according to claim 1, wherein when the amount of resources of the server system usable for executing migration changes during the migration, the server system changes the amount of resources allocated between the virtual servers within the amount of resources of the server system after the change, by re-executing the step of allocating an amount of usable resources to each of the policies in accordance with the resource use amount obtained for the policy, and the step of, in the migration according to each of the policies, allocating a certain amount of resources usable for executing the migration, to the virtual server which serves as either of a migration destination and a migration source, the certain amount of resources being determined within the amount of resources allocated to the policy.

7. The method for executing migration according to claim 1, wherein each of the virtual servers has a file system, the storage apparatus has a function of backing up data using a block transfer scheme on a logical volume basis, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, and the virtual server stores the stub in a specific logical volume in the storage apparatus.

8. The method for executing migration according to claim 1, wherein each of the virtual servers has a file system, the server system provides a virtual volume created using thin provisioning, for management of data in the storage apparatus, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, and in the deletion of the file entity, the virtual server issues a command to release a storage area of the logical volume previously used to store the file entity thus deleted.

9. A server system in an information processing system including:

at least one server system that accesses a storage apparatus in response to a request transmitted from a client device; and a plurality of virtual servers implemented in the server system, wherein the server system:

stores an amount of resources of the server system that are usable for executing migration, stores a plurality of policies each defining how to execute a corresponding one of a plurality of migrations, and including information for specifying a resource use amount of the server system to be used to execute the migration, for each of the policies, obtains the resource use amount needed to execute the migration according to the policy, and allocates an amount of usable resources to each of the policies in accordance with the resource use amount obtained for the policy, in the migration according to each of the policies, allocates a certain amount of resources usable for executing the migration, to the virtual server which serves as either of a migration destination and a migration source, the certain amount of resources being determined within the amount of resources allocated to the policy, and executes the migration according to each of the policies in accordance with the resource use amount allocated to the policy, wherein the information for specifying a resource use amount of the server system to be used to execute the migration includes any one of the number of data to be moved in the migration and a data size of the data to be moved.

10. The server system according to claim 9, comprising a CPU, a memory, a first communication adapter for communicating with another server system, and a second communication adapter for communicating with the storage apparatus, wherein if the virtual server serving as a data migration source and the virtual server serving as a data migration destination in the execution of the migration exist in the same server system, the resources allocated between the virtual servers include the CPU, the memory, and the second communication adapter, and if the virtual server serving as a data migration source and the virtual server serving as a data migration destination in the execution of the migration exist in the different server systems, respectively, the resources allocated between the virtual servers include the CPU, the first communication adapter, and the second communication adapter.

11. The server system according to claim 9, wherein for each of the policies, the resource use amount according to data size of data is pre-stored, the data size of data being to be moved in the migration from the virtual server serving as a data migration source to the virtual server serving as a data migration destination, for each of the policies, the resource use amount needed to execute the migration according to the policy is obtained based on the pre-stored resource use amount according to data size, and the resource use amount according to data size needed to execute the migration from the virtual server serving as a data migration source to the virtual server serving as a data migration destination is obtained by actually migrating test data there between according to the policy.

12. The server system according to claim 9, wherein when the amount of resources of the server system usable for executing migration changes during the migration, the amount of resources allocated between the virtual servers is changed within the amount of resources of the server system after the change, by re-executing the allocation, to each of the policies, of an amount of usable resources in accordance with the resource use amount obtained for the policy, and the allocation, in the migration according to each of the policies, of a certain amount of resources usable for executing the migration, to the virtual server which serves as either of a migration destination and a migration source, the certain amount of resources being determined within the amount of resources allocated to the policy.

13. The server system according to claim 9, wherein each of the virtual servers has a file system, the storage apparatus has a function of backing up data using a block transfer scheme on a logical volume basis, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, and the virtual server stores the stub in a specific logical volume in the storage apparatus.

14. The server system according to claim 9, wherein each of the virtual servers has a file system, the server system provides a virtual volume created using thin provisioning, for management of data in the storage apparatus, in the migration, the virtual server serving as a migration source in the migration deletes, from the storage apparatus, a file entity managed in the storage apparatus by the virtual server serving as a data migration source itself, and stores, in that storage apparatus, a stub including information specifying a migration destination of the file, and in the deletion of the file entity, the virtual server issues a command to release a storage area of the logical volume previously used to store the file entity thus deleted.

\* \* \* \* \*